United States Patent [19]

Yoshinaga et al.

[11] Patent Number: 5,066,107
[45] Date of Patent: Nov. 19, 1991

[54] LIQUID CRYSTAL DISPLAY MEDIUM, LIQUID CRYSTAL DISPLAY METHOD AND LIQUID CRYSTAL DISPLAY APPARATUS FOR OUTPUTTING COLOR IMAGES

[75] Inventors: Kazuo Yoshinaga, Machida; Shuzo Keneko, Yokohama; Takashi Kai, Hadano; Kazuo Isaka; Toshikazu Ohnishi, both of Tokyo, all of Japan

[73] Assignee: Canon Kabushiki Kaisha, Tokyo, Japan

[21] Appl. No.: 365,721

[22] Filed: Jun. 14, 1989

[30] Foreign Application Priority Data

Jun. 16, 1988 [JP] Japan .................. 63-146794
Jun. 16, 1988 [JP] Japan .................. 63-146795
Jun. 16, 1988 [JP] Japan .................. 63-146796

[51] Int. Cl.$^5$ ............................................. G02F 1/33
[52] U.S. Cl. ..................................... 359/45; 359/43; 359/100; 359/102; 359/103
[58] Field of Search ................. 350/351, 350 S, 350 R, 350/346, 331 R, 335, 331 T

[56] References Cited

U.S. PATENT DOCUMENTS

| | | | |
|---|---|---|---|
| 4,246,302 | 1/1981 | Benton et al. | 350/351 |
| 4,702,558 | 10/1987 | Coles et al. | 350/350 S |
| 4,877,858 | 10/1989 | Hachiya et al. | 528/100 |
| 4,904,065 | 2/1990 | Yuasa et al. | 350/350 S |
| 4,913,839 | 4/1990 | Uchida et al. | 350/350 S |
| 4,933,243 | 6/1990 | Hara et al. | 350/346 X |
| 4,952,033 | 8/1990 | Davis | 350/351 |
| 4,965,591 | 10/1990 | Kurabayashi et al. | 350/330 X |
| 4,995,705 | 2/1991 | Yoshinaga | 350/350 S |

FOREIGN PATENT DOCUMENTS

| | | |
|---|---|---|
| 0141512 | 5/1985 | European Pat. Off. |
| 62-066990 | 3/1987 | Japan . |
| 62-154340 | 7/1987 | Japan . |
| 62-014114 | 11/1987 | Japan . |
| 62-278530 | 12/1987 | Japan . |
| 0002128 | 3/1988 | PCT Int'l Appl. . |

OTHER PUBLICATIONS

Pat. Abs. Jap., vol. 12, No. 163 (1988) 152, p. 703.
Watanabe, Macromolecules, vol. 20, No. 1 (1987) 298:304.

Primary Examiner—Stanley D. Miller
Assistant Examiner—Ron Trice
Attorney, Agent, or Firm—Fitzpatrick, Cella, Harper & Scinto

[57] ABSTRACT

A display medium having a display face is composed of a plurality of display layers laminated parallel to the display face. Each display layer comprises a polymer liquid crystal having a mesomorphic temperature range between its glass transition temperature and the upper limit temperature of a liquid crystal phase used for display. The mesomorphic temperature ranges of the plurality of display layers do not overlap each other. The optical densities of the display layers are controlled independently from the other by controlling the heating temperatures and cooling rates of the display layers, and the gradation of each color can be also controlled, so that a full-color display can be realized.

19 Claims, 10 Drawing Sheets

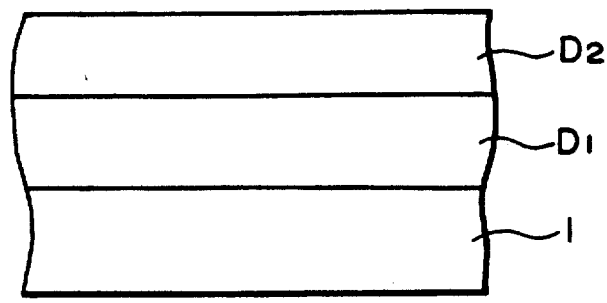
F I G. 1A
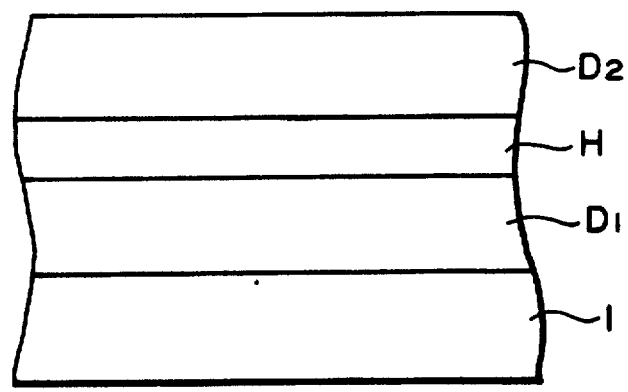
F I G. 1B

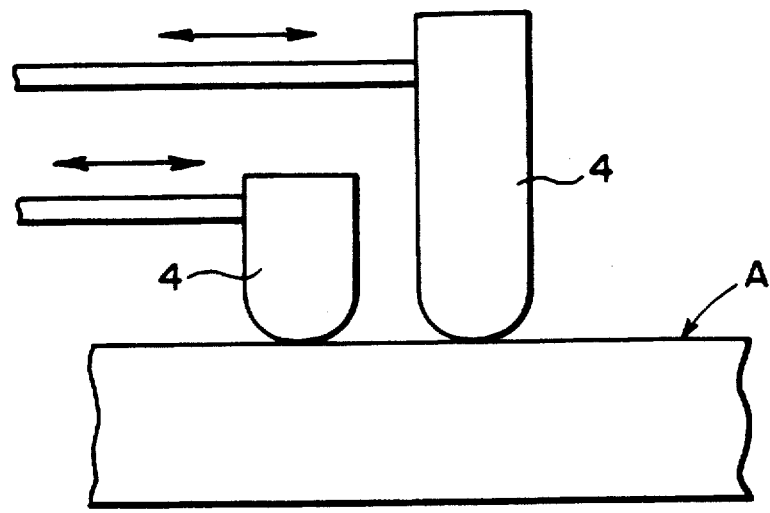
F I G. 6
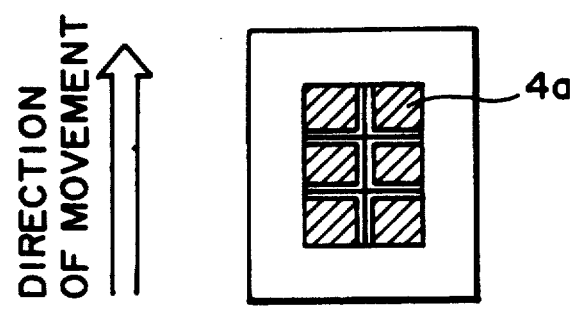
F I G. 7

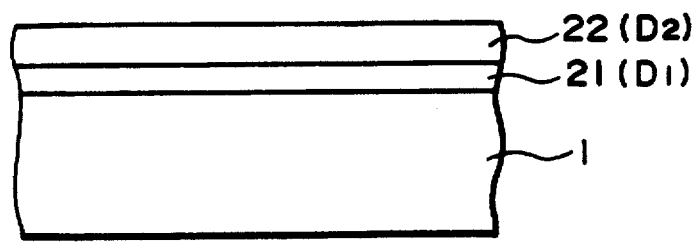
F I G. 8
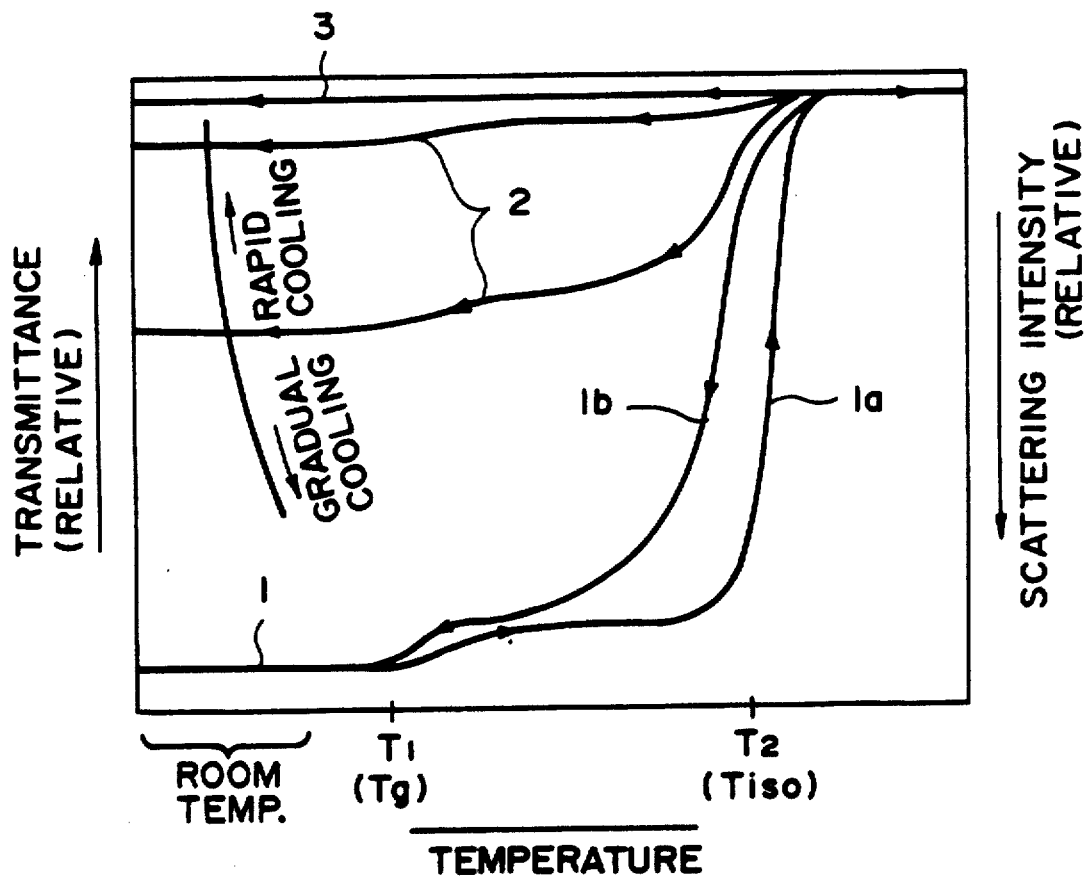
F I G. 9

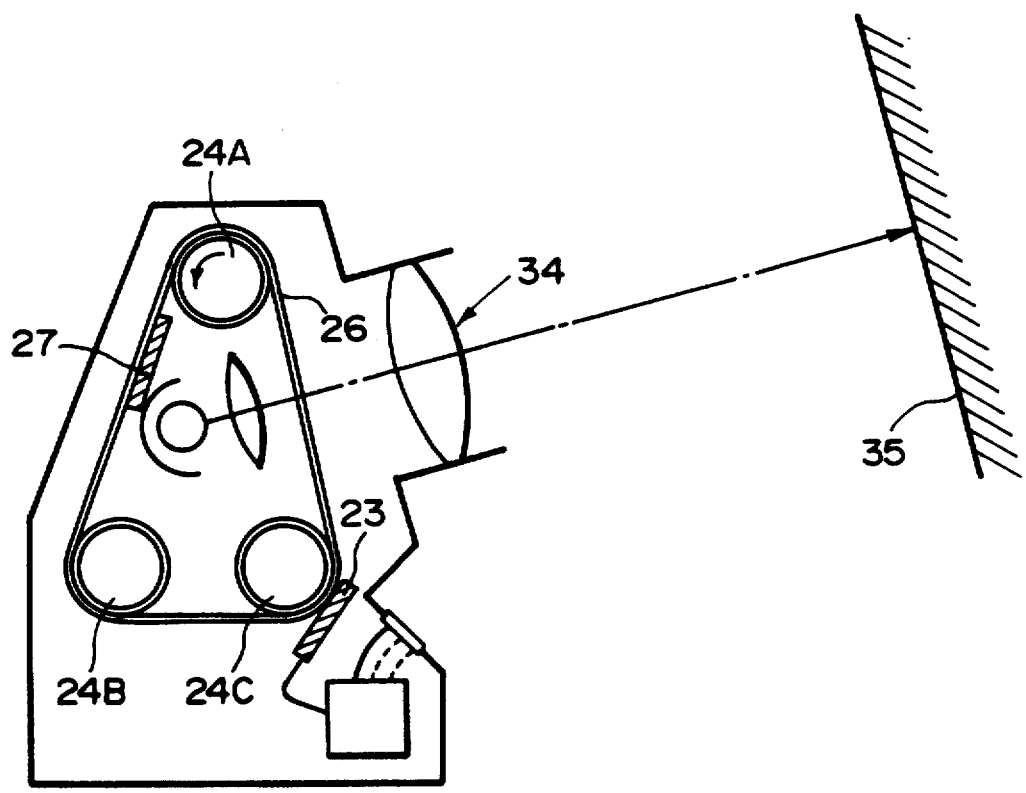
F I G. 15

LIQUID CRYSTAL DISPLAY MEDIUM, LIQUID CRYSTAL DISPLAY METHOD AND LIQUID CRYSTAL DISPLAY APPARATUS FOR OUTPUTTING COLOR IMAGES

FIELD OF THE INVENTION AND RELATED ART

The present invention relates to a display medium, a display method and a display apparatus for outputting and displaying images based on image signals received from a floppy disk, an optical disk, an optomagnetic memory medium, a computer, etc., or other image signals such as facsimile signals. More particularly, the present invention relates to a display medium, display method and a display apparatus for outputting a diversity of color images.

Hitherto, motion picture outputs of a television receiver or a VTR (video tape recorder) or outputs through conversational operation with a computer have been displayed on a display monitor such as a CRT (cathode ray tube) or a TN (twisted nematic)type liquid crystal panel, while fine images such as characters or figures outputted from a word processor or a facsimile machine have been printed out on paper to provide a hard copy.

A CRT provides a beautiful image for a motion picture output but causes degradation in observability due to flickering or scanning fringes because of insufficient resolution.

Further, a conventional liquid crystal display using a TN-liquid crystal as described above provides a thin apparatus but involves problems, such as troublesome steps including a step of sandwiching a liquid crystal between glass substrates, and a darkness of a picture.

Further, the CRT and TN-liquid crystal panel do not have a stable image memory characteristic, so that it is necessary to always effect beam scanning or application of pixel voltages even for output of still images as described above.

On the other hand, a hard copy image outputted on paper can be obtained as a stable memory image, but frequent use thereof is accompanied with the necessity of a large filling space, and the loss of resources caused by a large amount of disposal provides another problem.

On the other hand, there have been attempts to use a polymer liquid crystal as a display medium for outputting and displaying color images. For example, Japanese Laid-Open Patent Applications (KOKAI) Nos. 154340/1987 and 66990/1987 disclose a display medium comprising a cholesteric polymer liquid crystal, which, however, relates to a specific wavelength of light and does not show a sufficient performance as a display medium.

Further, Japanese Laid-Open Patent Applications (KOKAI) Nos. 14114/1987, 278530/1987 and 278529/1987 reports another type of display medium, which, however, is not sufficient for displaying color images.

Further, in order to color a polymer liquid crystal per se, it has been proposed to add a dichroic colorant or to use a polymer liquid crystal copolymerized with a colorant residue as disclosed in Japanese Laid-Open Patent Application (KOKAI) No. 176205/1983. However, no polymer liquid crystal providing a sufficient contrast or a good color purity has been obtained.

On the other hand, there has been proposed to use, instead of a polymer liquid crystal, a low-molecular weight cholesteric liquid crystal assuming a planar alignment to cause a change in color hue under application of an electric field (T. Uchida, C. Shishido and M. Wada, "Mol. Cryst. Liq. Cryst." 39 page 127 (1977)). In this system, however, a hue change can be caused only under application of an electric field and cannot be retained, and the fineness or resolution is determined by a driving electrode, so that it is difficult to display highly fine images for a large area.

SUMMARY OF THE INVENTION

Accordingly, an object of the present invention is to provide a display medium capable of providing a highly fine image display which can be of full color and can control the color and density for each pixel without color deviation.

Another object of the present invention is to provide a display medium capable of displaying highly fine color images with a clarity comparable to that obtained by a hard copy and capable of repetitively displaying and erasing color images.

A further object of the present invention is to provide a display method and a display apparatus using such a display medium.

More specifically, according to an aspect of the present invention, there is provided a display medium having a display face and comprising a plurality of display layers laminated parallel to the display face, each display layer comprising a polymer liquid crystal having a mesomorphic temperature range between its glass transition temperature and the upper limit temperature of a liquid crystal phase for display, the mesomorphic temperature ranges of said plurality of display layers being distinct from each other. Because of such a laminated structure, the color and density of a layer can be selected independently from another layer, so that a sufficient gradational display or full color display becomes possible.

According to other aspects of the present invention, there are provided a display method and a display apparatus using such a display medium as described above.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 1A, 1B and 2 respectively illustrate a laminar structure of a display medium according to the present invention.

FIG. 6 is an illustration of a thermal head used in the present invention and FIG. 7 is a plan view showing an example of a split pattern of such a thermal head.

FIG. 8 is a view illustrating a laminar structure of a second embodiment of the display medium according to the present invention.

FIG. 9 is a diagram showing a relationship between a temperature and a transmittance (or a scattering intensity) of a polymer liquid crystal used in a second polymer layer.

FIGS. 14A, 14B and 15 are schematic views for illustrating display apparatus using display media of the present invention.

DETAILED DESCRIPTION OF THE PREFERRED EMBODIMENTS

FIGS. 1A and 1B are schematic views each illustrating a laminar structure of a display medium according to the present invention.

Figure 2:
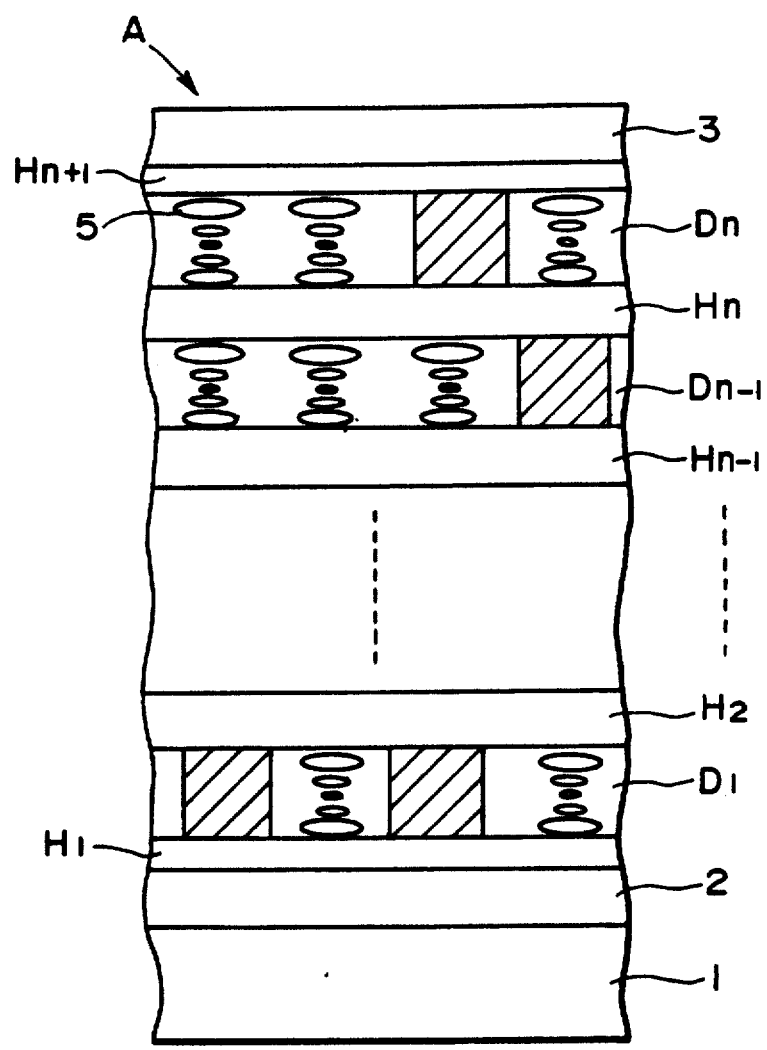

Referring to FIG. 1A, a display medium of the present invention comprises a substrate 1 and a first display layer $D_1$ and a second display layer $D_2$ disposed in this order on the substrate 1. The display medium can comprise an intermediate layer H between the first and second display layers (FIG. 2). The first display layer $D_1$ and the second display layer $D_2$ respectively comprise a polymer liquid crystal. Each of the first ($D_1$) and second ($D_2$) display layers has its own mesomorphic (phase) temperature range, i.e., a temperature range between its glass transition temperature and the upper limit temperature of a liquid crystal phase to be used for display, preferably a temperature range between its glass transition temperature and its mesomorphic-isotropic phase transition temperature. In some case, the upper limit temperature of a liquid crystal phase for display can be defined within a single liquid crystal phase (e.g., cholesteric phase) as a temperature providing different visual effects below and above the temperature (because of a change in cholesteric pitch). The first and second display layers ($D_1$ and $D_2$) are required to have mesomorphic temperature ranges which are distinct from (i.e., not overlapping) each other between the first and second display layers. The difference between two mesomorphic temperature ranges may preferably be 5° C. or more.

It is ordinary that each display layer comprises a different polymer liquid crystal comprising different glass transition temperature and phase-transition temperature. However, in case where a display layer comprises a mixture of, e.g., two or more polymer liquid crystals, it is sufficient that the display layer shows a different glass transition temperature and a phase transition temperature as the mixture.

The polymer liquid crystal used in the present invention may be a thermotropic main chain-type or side chain-type polymer liquid crystal showing a mesomorphic phase, such as nematic phase, smectic phase, chiral nematic phase or chiral smectic phase within a temperature range of from 0° C. to 300° C. Below 0° C., the temperature control becomes difficult, and above 300° C., an excessively large energy is required. It is important for the polymer liquid crystal to have a glass transition point so that its mesomorphic or liquid crystal texture can be fixed without a particular holding operation in order to provide a display with a memory characteristic. The polymer liquid crystal used in the present invention may preferably have 5 or more recurring units.

More specifically, the polymer liquid crystal showing chiral nematic phase or chiral smectic phase may also be of a side chain-type having a mesogen unit in its side chain or a main chain-type having a mesogen unit in its main chain. Specific examples of such a side chain-type polymer liquid crystal may include those represented by the following formulas (1)–(12), wherein * denotes the location of an asymmetric carbon atom, and n=5–1000.

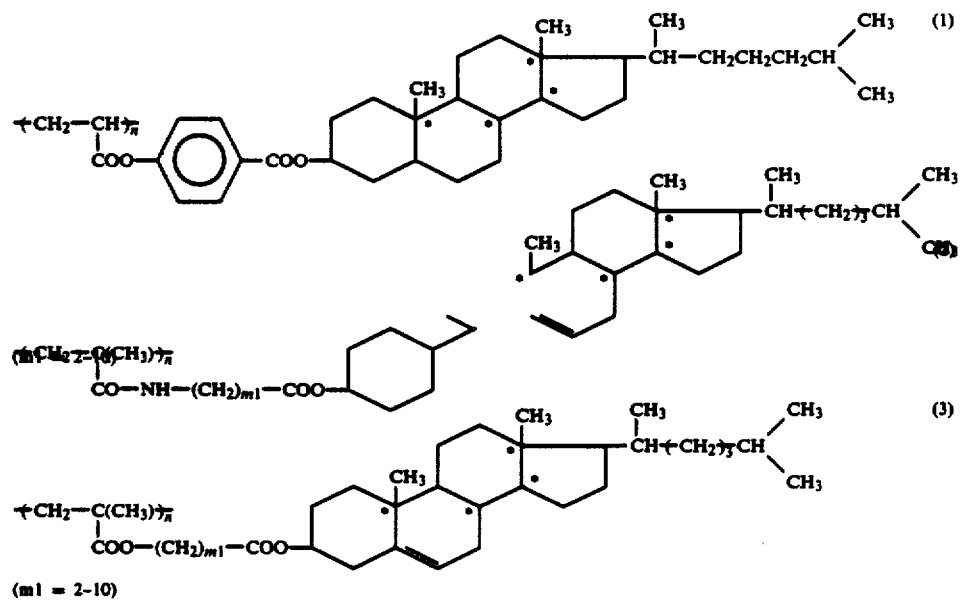

-continued
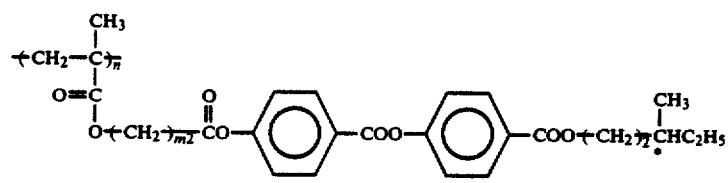
(m2 = 2–15)
(4)
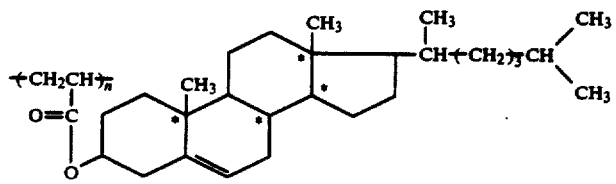
(5)
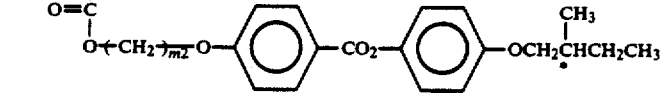
(m2 = 2–15)
(6)
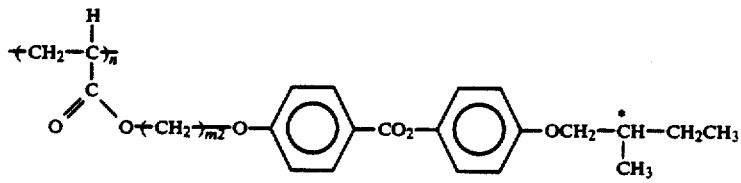
(m2 = 2–15)
(7)
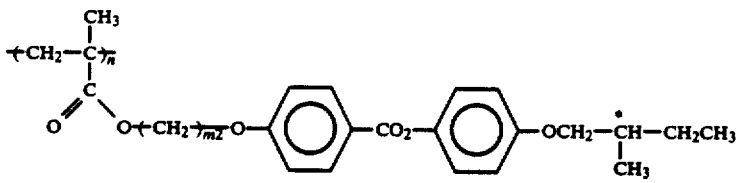
(m2 = 2–15)
(8)
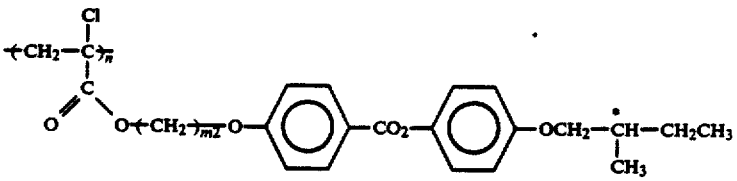
(m2 = 2–15)
(9)
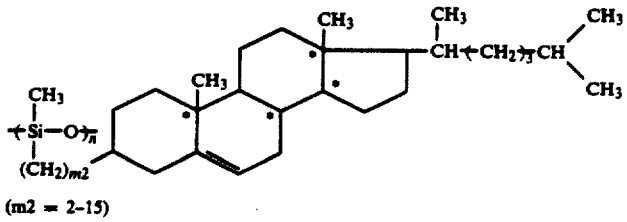
(m2 = 2–15)
(10)

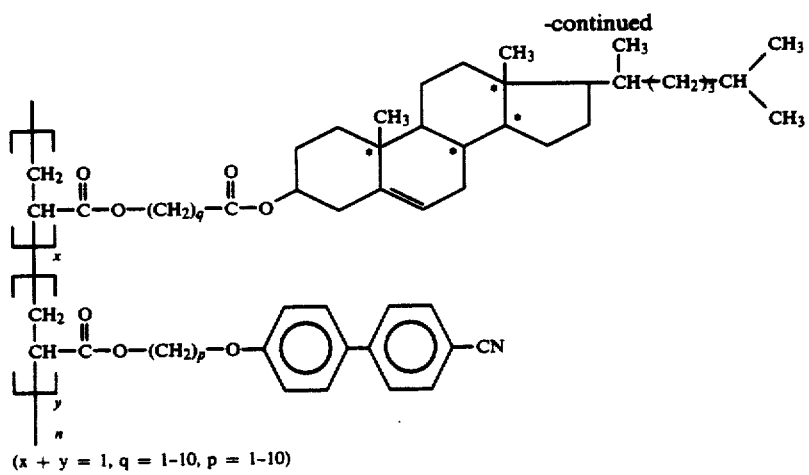

(11)

(x + y = 1, q = 1–10, p = 1–10)

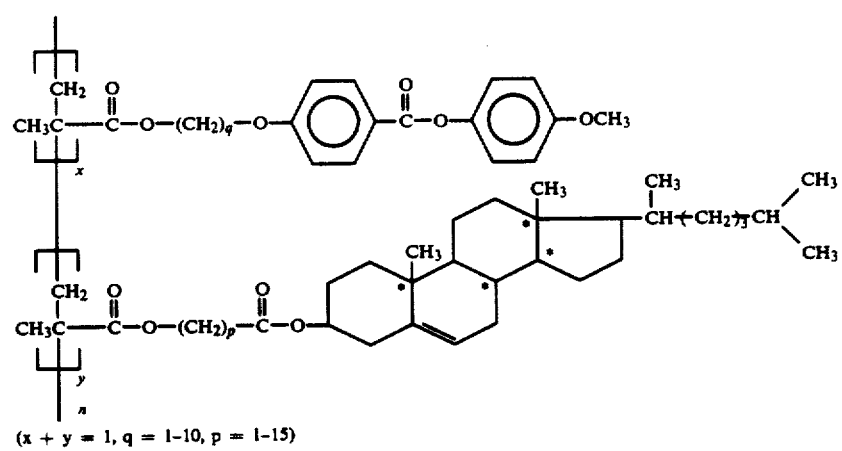

(12)

(x + y = 1, q = 1–10, p = 1–15)

The main chain-type polymer liquid crystal may comprise a mesogen unit, a flexible chain and an optically active group, which have been combined into a polymer by the medium of, e.g., an ester bond, amide bond, peptide bond, urethane bond or ether bond. An ester bond may preferably be used.

Examples of compounds used as mesogen unit sources may include: dicarboxylic acids, such as terphenyldicarboxylic acid, p-terephthalic acid, biphenyldicarboxylic acid, stilbenedicarboxylic acid, azobenzenedicarboxylic acid, azoxybenzenedicarboxylic acid, cyclohexanedicarboxylic acid, biphenyl etherdicarboxylic acid, biphenoxyethanedicarboxylic acid, and carboxycinnamic acid; diols, such as hydroquinone, dihydroxybiphenyl, dihydroxyterphenyl, dihydroxyazobenzene, dihydroxyazoxybenzene, dihydroxydimethylazobenzene, dihydroxydimethylazoxybenzene, dihydroxypyridazine, dihydroxynaphthalene, dihydroxyphenyl ether, and bis(hydroxyphenoxy)ethane; and hydroxycarboxylic acids, such as hydroxybenzoic acid, hydroxybiphenylcarboxylic acid, hydroxyterphenylcarboxylic acid, hydroxycinnamic acid, hydroxyazobenzenecarboxylic acid, hydroxyazoxybenzenecarboxylic acid, and hydroxystilbenecarboxylic acid.

Examples of compounds used as flexible chain sources may include: diols, such as methylene glycol, ethylene glycol, propanediol, butandiol, pentanediol, hexanediol, heptanediol, octanediol, nonanediol, decanediol, undecanediol, dodecanediol, tridecanediol, tetradecanediol, pentadecanediol, diethylene glycol, triethylene glycol, tetraethylene glycol, nonaethylene glycol, and tridecaethylene glycol; and dicarboxylic acids, such as malonic acid, succinic acid, glutaric acid, adipic acid, pimelic acid, suberic acid, azelaic acid, and sebacic acid.

Source compounds for providing an optically active group may preferably be difunctional ones, examples of which may include the following: (+)-3-methyl-1,6-hexanediol, (−)-3-methyl-1,6-hexanediol, (+)-3-methyladipic acid, (−)-3-methyladipic acid, (D)-mannitol, (L)-mannitol, (+)-pantothenic acid, (+)-1,2,4-trihydroxy-3,3-dimethylbutane, (−)-1,2-propanediol, (+)-1,2-propanediol, (+)-lactic acid, (−) lactic acid, (2S,5S)-2-methyl-3-oxahexane-1,5-diol, (2S, 5S, 8S)-2,5-dimethyl-3,6-dioxanonane-1,8-diol.

The polymer liquid crystal having an asymmetric carbon atom may be obtained by polycondensation of a mesogen unit-source compound, a flexible chain-source compound and an optically active group-source compound selected from those described above. In this instance, it is possible to use a catalyst in order to increase the degree of polymerization and decrease impurities due to side reactions, etc. In such a case, it is desirable to remove the catalyst after completion of the polycondensation.

Examples of the main chain-type polymer liquid crystal may include those represented by the following formulas (13)–(25), wherein n is 5–1000.

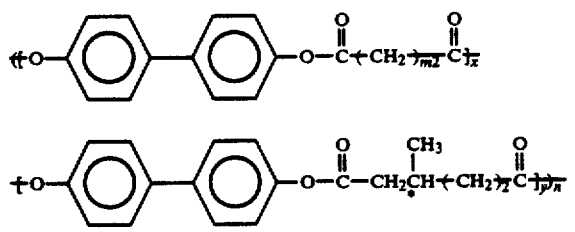
(13)
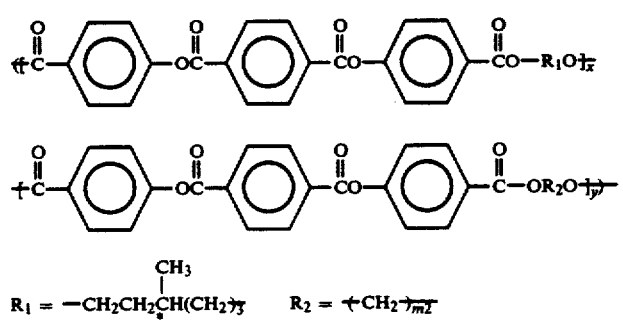
(m2 = 2-15, x + y = 1)
(14)
$R_1 = -CH_2CH_2\overset{*}{C}H(CH_2)_3$    $R_2 = \text{+}CH_2\overline{)_{m2}}$
(x + y = 1, m2 = 2-15)
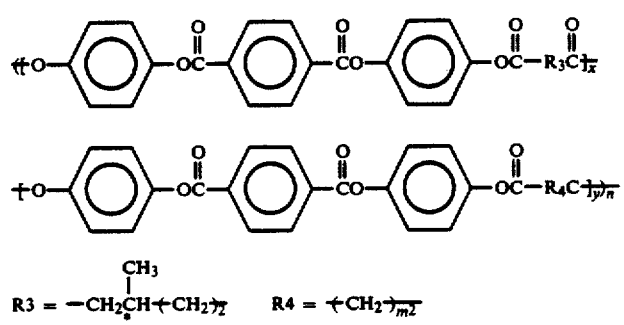
(15)
$R_3 = -CH_2\overset{*}{C}H\text{+}CH_2)_2$    $R_4 = \text{+}CH_2)_{\overline{m2}}$
(x + y = 1, m2 = 2-15)
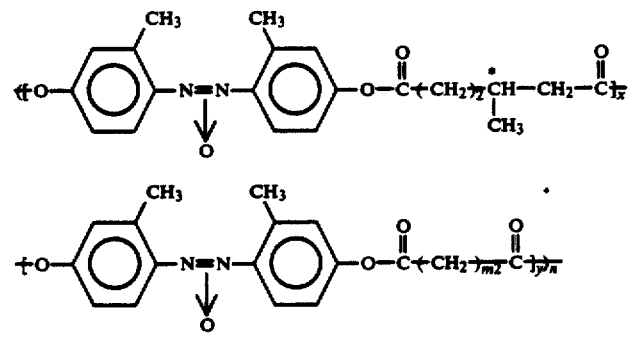
(16)
(x + y = 1, m2 = 2-15)
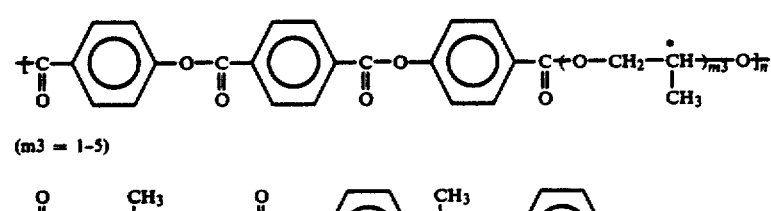
(17)
(m3 = 1-5)
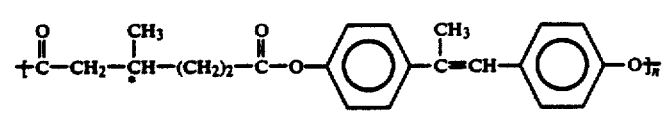
(18)

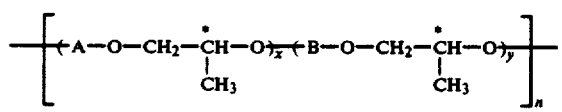
(19)
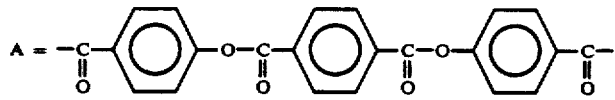
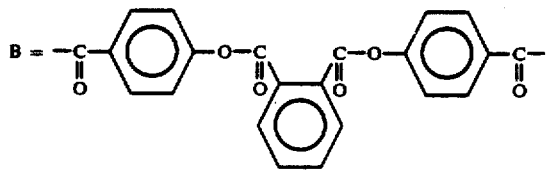
(x + y = 1)
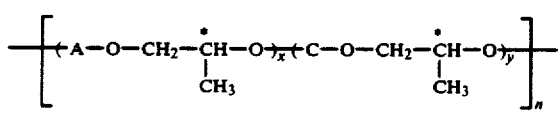
(20)
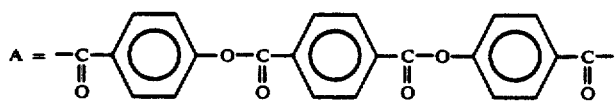
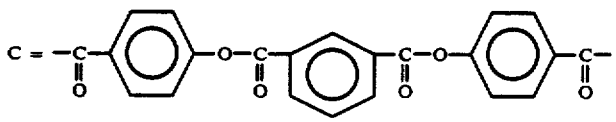
(x + y = 1)
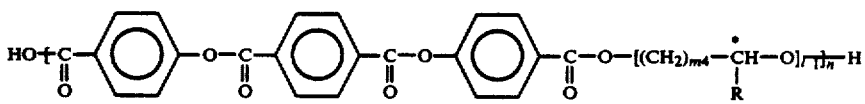
(21)
(m4 = 1–3, 11 = 1–20)
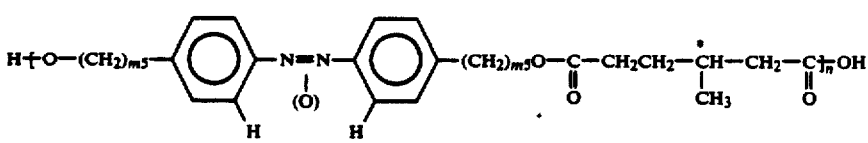
(22)
(m5 = 0–5)
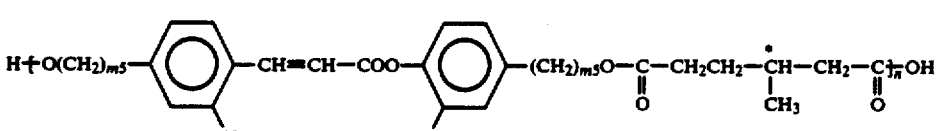
(23)
(m5 = 0–5)
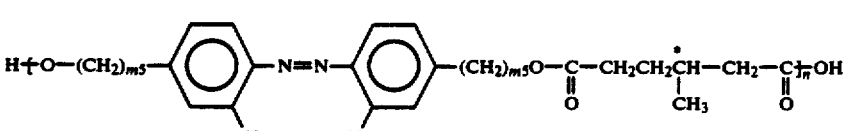
(24)
(m5 = 0–5)

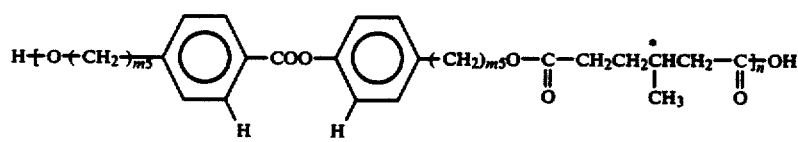

(25)

(m5 = 0–5)

Further, the polymer liquid crystal showing a nematic or smectic phase may also be of a main chain-type or a side chain-type. Such a polymer liquid crystal does not have an optically active group so that it does not show a helical structure. Such a polymer liquid crystal showing a nematic or smectic phase may be used alone or in combination with a polymer liquid crystal having an optically active groups as described above depending on the usage thereof. Specific examples thereof may include those represented by the following formulas (26)–(34), wherein $n2 = 5$–1000.

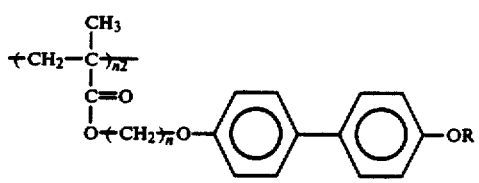

(26)

$R = C_mH_{2m+1}$—  $m = 1$–12
$n = 1$–12
$m = 1, n = 2$   $Tg = 110°$ C., $Tcl = 140°$ C.

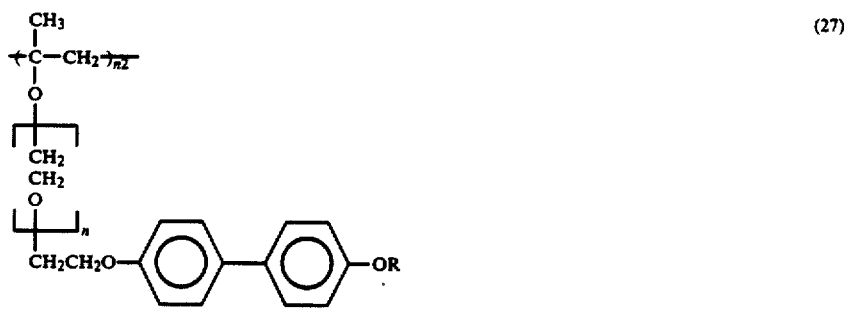

(27)

$R = C_mH_{2m+1}$—  $m = 1$–12
$n = 0$–10
$m = 1, n = 2$   $Tg = 40°$ C., $Tcl = 90°$ C.

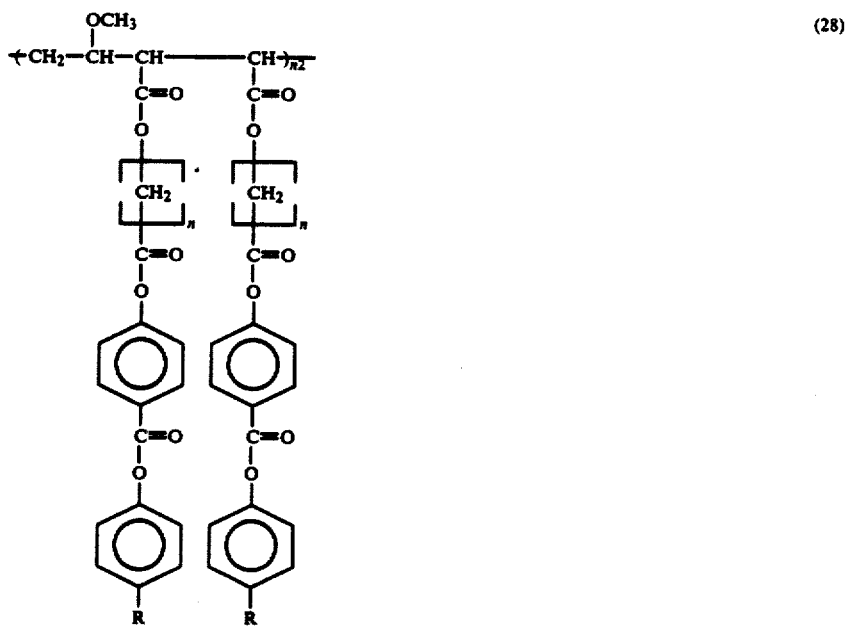

(28)

R = $C_mH_{2m+1}$O— m = 1–12
n = 1–12
m = 1, n = 1    Tg = 150° C., Tcl = 240° C.
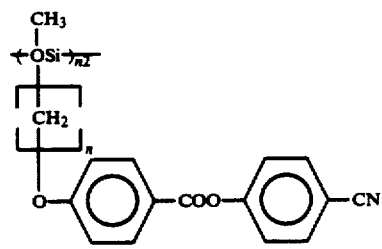
(29)
n = 1–12
n = 2, Tg = 20° C., Tcl = 161° C.
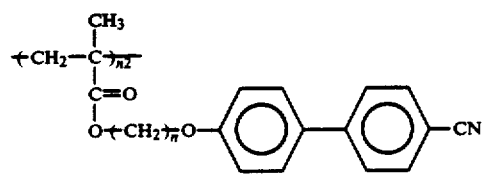
(30)
n = 1–12
n = 6, Tg = 55° C., Tcl = 100° C.
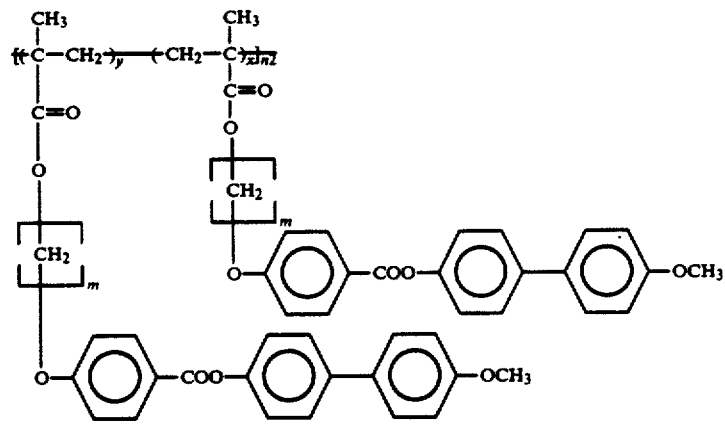
(31)
x + y = 1.0    m = 1–12
x = 0.1, y = 0.9, m = 2    Tg = 117° C., Tcl = 184° C.
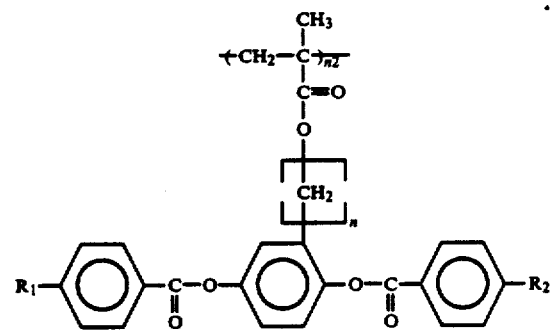
(32)
$R_1$ = $C_mH_{2m+1}$O—    m = 1–12
$R_2$ = $C_lH_{2l+1}$O—    l = 1–12
n = 1–12
m = l = 1, n = 11    Tg = 39° C., Tcl = 74° C.

-continued

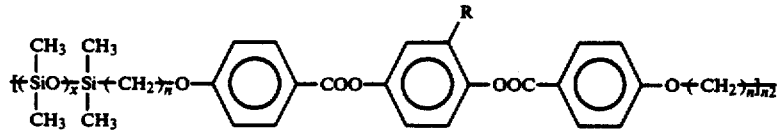
(33)

x = 1–12   n = 1–12
R = CH₃—, CH₃O—, Cl—, H—,
x = 3, n = 3, R = H—, Tg = 5° C., Tcl = 114° C.

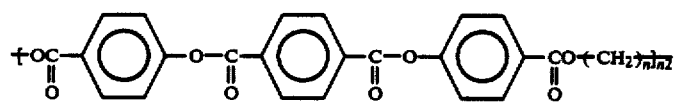
(34)

n = 1–8
n = 8, Tcl = 220° C.

In the present invention, it is possible to use a composition comprising a polymer liquid crystal as described above and a low-molecular weight liquid crystal mixed in appropriate proportions under heating or in the presence of a common solvent. The low-molecular weight liquid crystal should be compatible with a polymer liquid crystal and may preferably be one having an asymmetric carbon center. Specific examples thereof may include chiral liquid crystals represented by the following formulas (35)–(49), but these are not exhaustive. In the following formulas, the respective symbols denote the following phases.

Cryst.: crystal,
SmC*: chiral smectic C phase,
SmH*: chiral smectic H phase,
SmA: smectic A phase,
SmB: smectic B phase,
Sm3: un-identified smectic phase,
Ch.: cholesteric phase,
N: nematic phase, and
Iso.: isotropic phase.

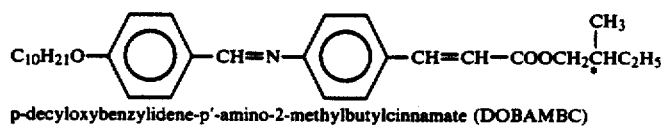
(35)

p-decyloxybenzylidene-p'-amino-2-methylbutylcinnamate (DOBAMBC)

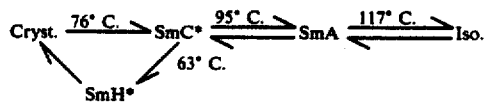

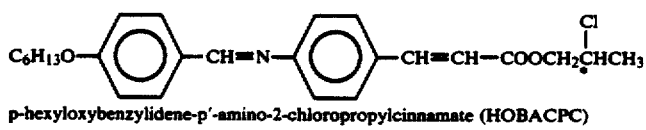
(36)

p-hexyloxybenzylidene-p'-amino-2-chloropropylcinnamate (HOBACPC)

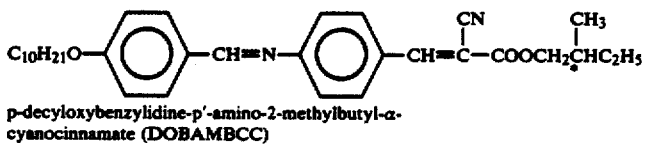
(37)

p-decyloxybenzylidine-p'-amino-2-methylbutyl-α-cyanocinnamate (DOBAMBCC)

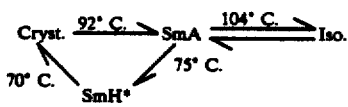

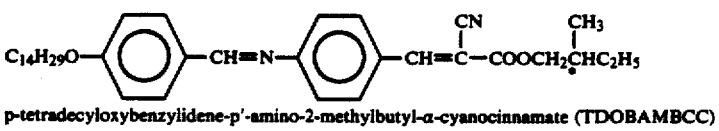
(38)

p-tetradecyloxybenzylidene-p'-amino-2-methylbutyl-α-cyanocinnamate (TDOBAMBCC)

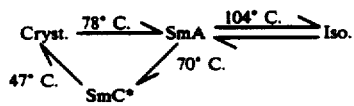

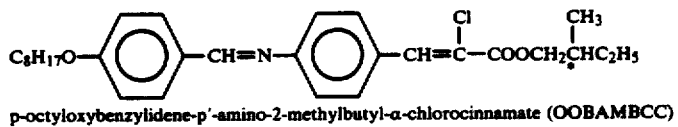

(29)

p-octyloxybenzylidene-p'-amino-2-methylbutyl-α-chlorocinnamate (OOBAMBCC)

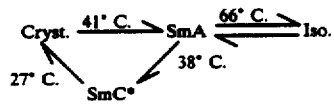

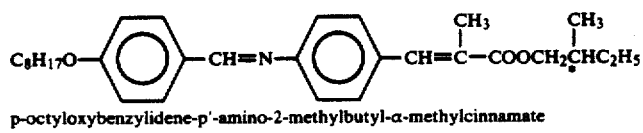

(40)

p-octyloxybenzylidene-p'-amino-2-methylbutyl-α-methylcinnamate

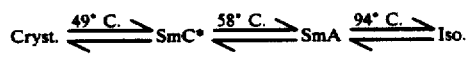

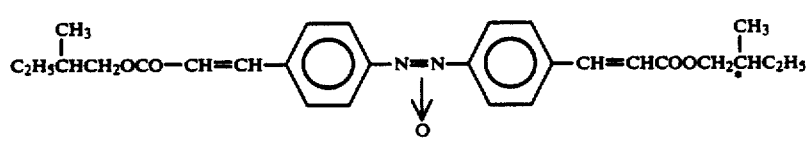

(41)

4,4'-azoxycinnamic acid-bis(2-methylbutyl)ester

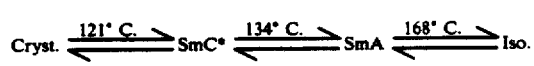

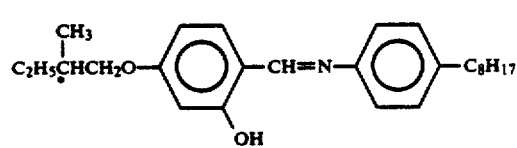

(42)

4-O-(2-methylbutyl)resorcylidene-4'-octylaniline (MBRA 8)

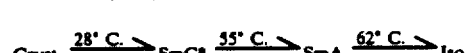

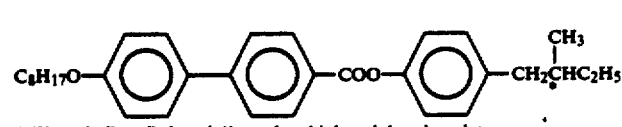

(43)

4-(2'-methylbutyl)phenyl-4'-octyloxybiphenyl-4-carboxylate

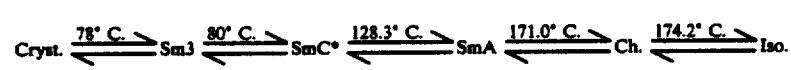

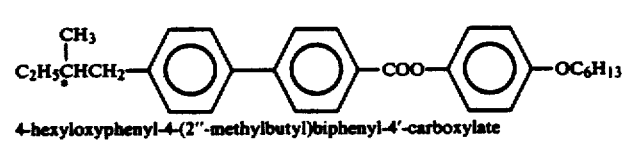

(44)

4-hexyloxyphenyl-4-(2''-methylbutyl)biphenyl-4'-carboxylate

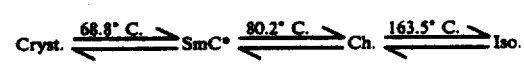

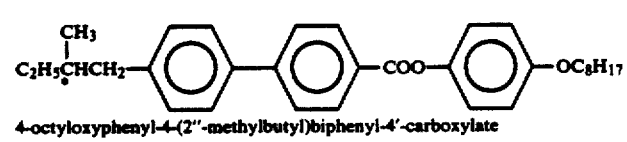

(45)

4-octyloxyphenyl-4-(2''-methylbutyl)biphenyl-4'-carboxylate

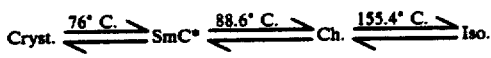

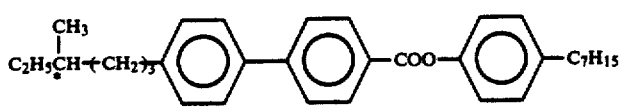

(46)

4-heptylphenyl-4-(4''-methylhexyl)biphenyl-4'-carboxylate

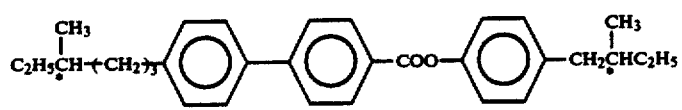

(47)

4-(2''-methylbutyl)phenyl-4-(4''-methylhexyl)biphenyl-4'-carboxylate

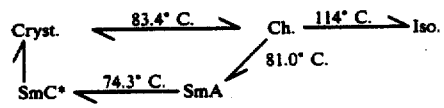

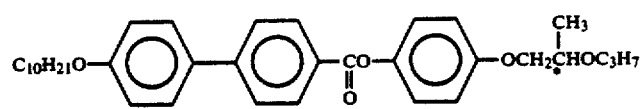

(48)

4-(2''-methylbutyl)phenyl-4-(4''-methylhexyl)biphenyl-4'-carboxylate

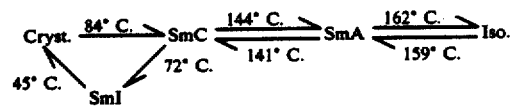

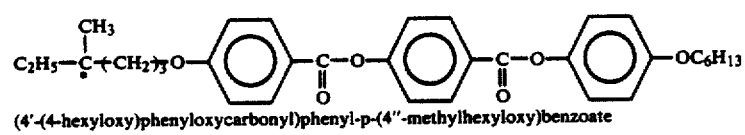

(49)

(4'-(4-hexyloxy)phenyloxycarbonyl)phenyl-p-(4''-methylhexyloxy)benzoate

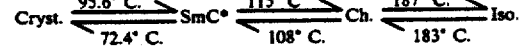

In such a polymer liquid crystal composition comprising a polymer liquid crystal and a low-molecular weight liquid crystal, it is desirable that the polymer liquid crystal is contained in a proportion of 50 wt. % or more, preferably 70 wt. % or more. Below 50 wt. %, it is difficult to effect sufficient fixation of a display state.

In addition to the above-mentioned polymer liquid crystals, various polymer liquid crystals, such as discotic polymer liquid crystals and thermotropic mesomorphic glutamic acid copolymers, may also be used.

Further, for a color image display, it is possible to add a dichroic colorant in the display layer so as to effect a good display by utilizing the dichorism.

Further, when laser light is used as a heating means, it is effective to add a light-absorbing agent corresponding to the wavelength of the laser light.

Such a polymer liquid crystal or a polymer liquid crystal composition obtained from such a polymer liquid crystal may be used in a separate film or may be formed in a layer disposed on a substrate. Each polymer liquid crystal layer may have a thickness of 1 -200 microns, preferably 5-100 microns.

The substrate 1 used in the present invention may be composed of an arbitrary material, such as glass, plastic or metal, and a transparent electrode of, e.g., ITO film or a patterned electrode can be formed thereon as desired.

The display layer $D_1$ or $D_2$ may be formed on such a substrate 1 by forming a coating liquid of a polymer liquid crystal or its composition as by heat melting or dissolution in a solvent and applying the coating liquid on the substrate by spin coating, casting, dipping, bar coating, roller coating, gravure coating, doctor blade, etc.

In the present invention, polymer liquid crystals having different helical pitches (including one having no helical structure) can be used. In order to apply such polymer liquid crystals in mosaic or in stripes, screen printing, patterning by using a photoresist or the like may be suitably used.

In the present invention, a display medium having a plurality of display layers, $D_1$, $D_2$, . . . having different mesomorphic temperature ranges (FIG. 1) can be formed by repeating the above-mentioned application step. In this instance, an intermediate layer H can be inserted between adjacent display layers, $D_1$, $D_2$ . . . comprising polymer liquid crystals (FIG. 2). The intermediate layer H may be used to prevent a direct contact between adjacent display layers. The intermediate layer can be composed of an electrode but may generally be formed as an insulating layer composed of an inorganic material, such as silicon monoxide, silicon dioxide, aluminum dioxide, zirconia, magnesium fluorides cerium oxide, cerium fluoride, silicon nitride, or boron nitride; or an organic material, such as polyvinyl alcohol, polyimide, polyamide-imide, polyester-imide, polyparaxylylene, polyester, polycarbonate, and polyvinyl acetal.

The intermediate layer H may have a thickness in the range of 0.1-100 microns. Below 0.1 micron, a sufficient separation effect cannot be attained. In excess of 100 microns, a sufficient heat transfer between adjacent display layers cannot be effected and a heat diffusion is caused in the intermediate layer so that color deviation of written parts occurs between the adjacent display layers. The intermediate layer may preferably have a thickness in the range of 0.5-10 microns.

The intermediate layer can also be composed as an alignment layer of an insulating film provided with an alignment control function. Such an alignment film is used particularly effectively when a chiral display layer is used for color image display.

In this instance, in case where a chiral smectic phase of a display layer is used for display, the alignment film may preferably be one subjected to a homogeneous orientation or aligning treatment.

The homogeneous aligning treatment may be performed by stretching under the action of a mechanical force, roller stretching, shearing, application of an electric field or magnetic field or interfacial control. In case where a substrate is used, a homogeneous aligning treatment by interfacial control is particularly preferred.

Specific examples of the homogeneous aligning treatment by interfacial control may include the following.

(1) Rubbing method

A substrate is coated with an alignment control film by forming a film of, e.g., an inorganic insulating substance, such as silicon monoxide, silicon dioxide, aluminum oxide, zirconia, magnesium fluoride, cerium oxide, cerium fluoride, silicon nitride, silicon carbide or boron nitride; or an organic insulating substance, such as polyvinyl alcohol, polyimide, polyamide-imide, polyester-imide, polyparaxylylene, polyester, polycarbonate, polyvinyl acetal, polyvinyl chloride, polyamide, polystyrene, cellulosic resin, melamine resin, urea resin or acrylic resin, by application of a solution, vapor deposition or sputtering.

The alignment control film formed as a film of an inorganic insulating substance or organic insulating substance as described above may then be rubbed in one direction with velvet, cloth or paper on the surface thereof.

(2) Oblique vapor deposition

An oxide such as SiO, a fluoride, or a metal such as Au or Al or its oxide, is vapor-deposited on a substrate in a direction forming an angle inclined with respect to the substrate.

(3) Oblique etching

An organic or inorganic insulating film as described in (1) above formed on a substrate is etched by radiation with an ion beam or oxygen plasma incident in an oblique direction.

(4) Use of a stretched polymer film

A film of obtained by stretching a film of a polymer such as polyester or polyvinyl alcohol also shows a good orientation characteristic.

(5) Grating

Grooves are formed on a substrate surface by photolithography, stampling or injection, so that liquid crystal molecules are aligned along the grooves.

Further, in case where a chiral smectic phase of a display layer is used for display, the alignment film may preferably be one subjected to a homeotropic orientation or aligning treatment.

The homeotropic aligning treatment may be performed by stretching under the action of a mechanical force, roller stretching, shearing, application of an electric field or magnetic field, or interfacial control. In case where a substrate is used, a homeotropic aligning treatment by interfacial control is particularly preferred.

Specific examples of the homeotropic aligning treatment by interfacial control may include the following.

(1) Formation of a homeotropic alignment film

A substrate surface is coated with a layer of an organic silane, lecithin or PTFE (polytetrafluoroethylene) having a homeotropic orientation characteristic.

(2) Oblique vapor deposition

Oblique vapor deposition is performed on a substrate while the substrate is rotated and the vapor deposition angle is appropriately selected to provide a homeotropic orientation characteristic. Further, it is also possible to apply a homeotropic aligning agent as shown in (1) above after the oblique vapor deposition.

Various orientation or aligning treatments as described above may be used singly or in combination of two or more methods.

By using a display medium shown in FIG. 1 which comprises laminated display layers having mesomorphic temperature ranges which are distinct from each other, the optical densities of the respective display layers can be independently controlled. Further, if each layer is controlled to assume a transparent, opaque or intermediate color state, more levels of intermediate tones can be displayed.

On the other hand, in the case where a plurality of display layers respectively have a helical structure and are used to effect a display by utilizing selective scattering depending on their helical pitches, a full color display becomes possible at each pixel if each pixel is caused to have three display layers having their helical pitches corresponding to three primary colors of red (R), green (G) and blue (B) and each layer is controlled to effect color selection, so that it becomes possible to effect a highly fine color image display free from color deviation. In this instance, if the principal axis of such a helical structure is caused to align perpendicularly to the display face of a display layer, the efficiency of selective scattering is further increased.

Hereinbelow another embodiment of the display medium according to the present invention will be explained.

FIG. 2 is a schematic sectional view illustrating a display medium A comprising display layers in which helical structures are formed. Referring to FIG. 2, the display medium A according to the present invention comprises a substrate 1 having thereon a light-absorbing layer 2 on which are successively further disposed a first alignment layer $H_1$, a first display layer $D_1$, a second alignment layer $H_2$, a second display layer $D_2$, ... an n-th alignment layer $H_n$, an n-th display layer $D_n$, an $(n+1)$th alignment layer $H_{n+1}$, and a surface protective layer 3. The polymer liquid crystals having a chiral phase and constituting the first to n-th display layers have mutually distinct mesomorphic temperature ranges each defined as a temperature range from a glass transition temperature to the upper limit of a liquid crystal phase used for display.

As shown in FIG. 2, a light-absorbing layer 2 may be disposed so as to provide an increased contrast by absorbing light other than that given by selective scattering. Such a light-absorbing layer is constituted to have an optical density of 1.0 or higher, e.g., as a resin layer containing a black pigment such as carbon black.

Further, the surface protective layer 3 may be disposed so that the surface of the display layer is not damaged as by thermal degradation or thermal distortion, e.g., when writing or erasure is effected by a thermal head. Such a surface protective layer may be composed of three-dimensionally crosslinked fluorine-containing resin, polysiloxane resin, acrylic resin or methacrylic resin. The thickness of the protective layer may be 0.1 micron to 100 microns.

Then, referring to the display medium shown in FIG. 2, a method of controlling the optical density of a display layer comprising a polymer liquid crystal among the laminated display layers independently from the other layers, will be explained.

Referring to FIG. 2, the n-th display layer $D_n$ is assumed to have a glass transition temperature $TG_n$ and a liquid crystal phase upper limit temperature $TC_n$. An n-th layer is assumed to be heated to $TA_n$ and an $(n-1)$th layer having, e.g., a lower mesomorphic temperature range than the n-th layer is assumed to be heated to $TA_{n-1}$, respectively, e.g., by a thermal head. In this case, the following relationship exists:

$$TA_n > TC_n > TG_n \geq TA_{n-1}.$$

In general, however, the number (n) of display layers need not be laminated in the order of their mesomorphic temperature ranges but can be laminated in a random order.

In this instance, when the n-th display layer is selected to provide a scattering state, a pixel concerned is heated up to $TA_n$ and cooled to the temperature of $TC_n$ and then gradually cooled to $TG_n$, followed by rapid cooling, so that the pixel in the n-th display layer is fixed in the liquid crystal phase. On the other hand, pixels other than the pixel concerned are heated to $TA_n$ and then rapidly cooled so that all the layers including the n-th layer are fixed in their amorphous phase to provide a transparent state and allow a light absorption at the light-absorbing layer 2. When the $(n-1)$th layer is selected, a pixel concerned is heated to $TA_{n-1}$ and then rapidly cooled to $TC_{n-1}$, followed by gradual cooling down to $TG_{n-1}$ and then rapid cooling, to fix the $(n-1)$th layer in a light-scattering liquid crystal state while the layers other than the $(n-1)$th layer are fixed in a transparent amorphous state so as to allow a light absorption at the light-absorbing layer 2.

Figure 3:
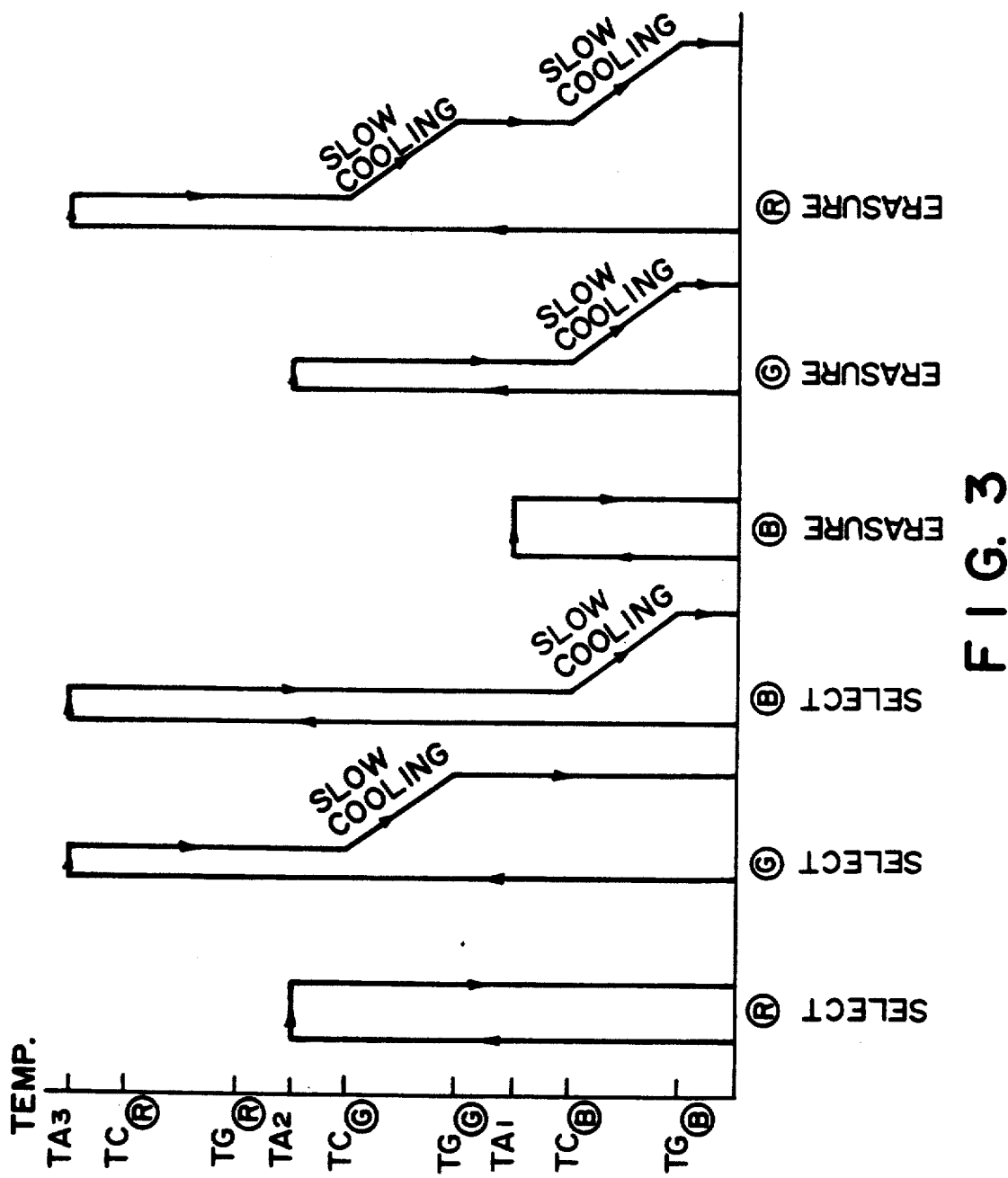
FIG. 3 is a diagram showing a temperature control pattern for selecting and erasing each layer of a display medium independently from the other layers.

Hereinbelow, a display medium having three display layers is taken as a representative example and explained more specifically. The three display layers include a display layer (®R layer) showing a selective scattering at around 650 nm, a display layer (®G layer) showing a selective scattering at around 550 nm, and a display layer (®B layer) showing a selective scattering at around 450 nm. The respective layers are assumed to have glass transition temperatures TG ®R, TG ®G and TG ®B and liquid crystal phase transition temperatures (to a high temperature phase, e.g., isotropic phase) TC ®R, TC ®G and TC ®B. Further, these layers are assumed to be heated to three levels of temperatures $TA_1$, $TA_2$ and $TA_3$. FIG. 3 shows temperature control pattern for independently selecting (writing in a scattering state) or erasing (into a transparent state) the ®R, ®G and ®B layers when the following relationship is satisfied:

$$TA_3 > TC\text{®R} > TG\text{®R} \geq TA_2 > TC\text{®G} > TG\text{®G} \geq TA_1 > TC\text{®B} > TG\text{®B}$$

By controlling the heating temperature and cooling rate for the respective layers, the selection (into a light scattering state) and erasure (into a transparent state) of the respective layers can be effected.

Further, the degree of liquid-crystallinity of each layer can be controlled by changing the heating temperature, holding time and cooling rate of the layer, so that optical density of the layer can be controlled continuously. As a result, a gradational display of R, G and B can be effected for each pixel, and a highly fine image display with a full color can be effected without color deviation.

In the above-mentioned selection of the respective display layers by temperature modulation, a further effective control becomes possible by controlling a temperature distribution due to heat conduction.

Further, in a system of using laser light as a heat source, it is preferred to respectively control the densities of light-absorbing agents added to the display layers.

In the present invention, by arranging two or more heating means, such as thermal heads 4 in the direction of sequentially performing recording and erasure on a display medium A as shown in FIG. 6, so that the pixels in the display layer are sequentially selected by the heating means to effect the temperature modulation of a polymer liquid crystal therein, whereby the optical density of each layer can be controlled independently for each pixel.

Further, the thermal head used in the present invention can be a split-type one having a plurality of split heating elements as shown in FIG. 7 so as to effect a multi-level heating.

A display apparatus used in a display method as described above may preferably comprise a display medium as described above, means for sequentially selecting a pixel in a display layer of the display medium and heating means comprising two or more thermal heads arranged in the direction of sequentially effecting recording and erasure on the display medium.

The present invention also provides a display medium as shown in FIG. 8, which comprises on a substrate 1, a first polymer layer 21 comprising a chiral polymer liquid crystal (as a first display layer $D_1$ in FIG. 1) and a second polymer layer 22 capable of providing a light-scattering state (as a second display layer $D_2$).

The first polymer layer 21 may suitably comprise a side chain-type or main chain-type polymer liquid crystal showing cholesteric liquid crystal phase or chiral smectic liquid crystal phase as a mesomorphic phase, which can select a state of reflecting or transmitting a selected wavelength of visible light and fix the state by changing the temperature.

tute the second polymer layer may include those represented by the following formulas (50)–(53):

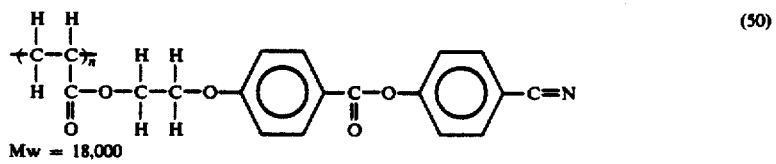
(50)

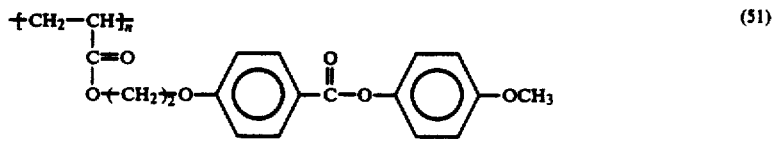
(51)

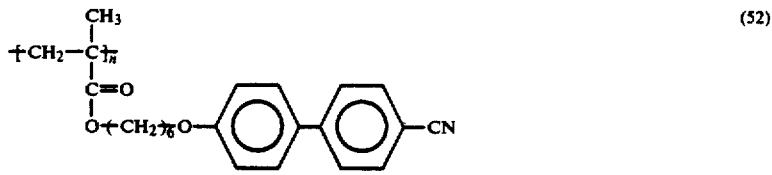
(52)

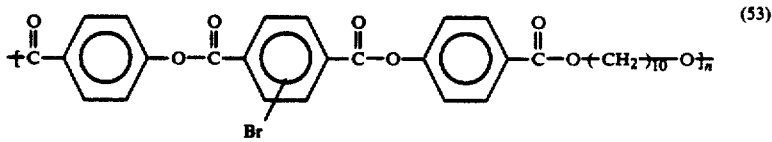
(53)

The color presentation and materials of cholesteric liquid crystal polymers for selective reflectance by changing chiral pitches due to temperature change, have been described, e.g., in Iimura, Asada and Abe, "Liquid Crystal Polymers", Chapter 3.2 (1988) published from Sigma Shuppan K.K.; "Macromolecules", Vol. 20, No. 2, page 298- (1987); Watanabe et al, "Thermotropic Peptides 3"; "Makromol. Chem., Makromol. Symp." Vol. 12, page 203 (1987). Chiral smectic liquid crystal polymers are expected to also present colors because of their chiral pitches.

The second polymer layer 22 may suitably comprise a side chain-type or main chain-type thermotropic polymer liquid crystal comprising, as a main chain, methacrylic acid polymer, siloxane polymer, polyester-type polymer or polyamide-type polymer and a low-molecular weight liquid crystal or mesogen unit in its side chain in a pendant form or in its main chain. The second polymer layer 22 may assume a mesomorphic phase of smectic, chiral smectic, nematic or cholesteric phase, or further a discotic phase.

Specific polymer liquid crystals constituting the first polymer layer or the second polymer layer can be selected from the above-mentioned examples (1)–(34) (and can also be combined with low-molecular weight liquid crystal examples (35)–(49)) depending on the desired conditions. Further, examples suitable to consti- The function of the second polymer layer 22 will now be explained based on a specific example wherein a polymer liquid crystal of the above formula (50) was used.

The above polymer liquid crystal (50) was dissolved in dichloroethane at a concentration of 20 wt. % and the solution was applied by an applicator on a polyester transparent substrate washed with alcohol, followed by standing at 95° C. for 10 minutes to form a white scattering film in a thickness of about 10 microns.

The thus obtained white sheet was scanned in a pattern of character or figure by a thermal head, whereby a white pattern corresponding to the scanned pattern was fixed. When the sheet was placed on a backing member having an optical density of 1.2, a clear black display was obtained against the white background. Further, the sheet was projected by means of an ordinary overhead projector (OHP), whereby a clear white image was displayed on a screen.

Then, the whole area of the above sheet having the above-mentioned pattern was heated to about 120° C. and then heated at about 90° C. for several seconds, whereby the original white scattering state was restored on the whole area and stably retained even if cooled to room temperature as it was, so that additional recording and display were possible.

The above series of phenomena can be controlled based on the fact that the above-mentioned polymer liquid crystal can assume at least three states including a film state below the glass transition point where it retains a stable memory state, a liquid crystal state where it can be transformed into a substantially optical scattering state and an isotropic film state at a higher temperature where it assumes an isotropic molecular alignment.

Now, the principle process of image formation by using a polymer liquid crystal layer formed on a transparent substrate is explained with reference to FIG. 9, which shows changes in reflectance or scattering intensity of a polymer liquid crystal layer versus temperature.

Referring to FIG. 9, the above-mentioned scattering state corresponds to a state ①. When the polymer liquid crystal layer in the state ① is heated by a heating means, such as a thermal head or laser light, to a temperature above $T_2$ (Tiso=isotropic state transition temperature) along a path denoted by 1a and then rapidly cooled, a light-transmissive state as shown by ③ similar to the isotropic state is fixed. Herein, "rapid cooling" means cooling at a rate sufficiently large as to fix the state before the cooling without substantial growth of an intermediate or mesomorphic state, such as a lower-temperature liquid crystal phase. Such a rapid cooling condition can be realized without a particular cooling means and by having the recording medium stand in air for natural cooling. The thus-fixed isotropic state is stable at a temperature below $T_1$ (Tg: glass transition point), such as room temperature or natural temperature, and is stably used as an image memory.

On the other hand, if the polymer liquid crystal layer heated to above $T_2$ as indicated by a curve 1a is held at a liquid crystal temperature between $T_1$ and $T_2$ for a period of, e.g., 1 second to several seconds, the polymer liquid crystal layer increases the scattering intensity during the holding period as indicated by a curve 1b to be restored to the original scattering state ① at room temperature. The resultant state is stably retained at a temperature below $T_1$.

Further, if the polymer liquid crystal layer is cooled while taking a liquid crystal temperature between $T_1$-$T_2$ for a period of, e.g., about 10 milliseconds to 1 second as indicated by curves ②, an intermediate transmissive state is obtained at room temperature, thus providing a gradation.

Thus, in this embodiment, the resultant transmittance or scattering intensity may be controlled by controlling the holding period at a liquid crystal temperature after heating into an isotropic state and until cooling to room temperature. The resultant state may be stably retained below $T_1$. Further, the velocity of restoring to the original scattering state is larger at a temperature closer to $T_2$ in the liquid crystal temperature range. If the medium is held at a temperature within the liquid crystal temperature range for a relatively long period, the scattering state ① can be restored without heating once into isotropic phase or regardless of the previous state.

A polymer liquid crystal showing an optical scattering state and a transparent state in the abovedescribed manner is optimally used to constitute the second polymer layer. In addition, a phase separation polymer or another phase transition polymer showing a light-scattering effect through another known mechanism can also be used to constitute the second polymer layer.

In the display method according to the present invention, the display medium comprising a chiral first polymer layer and a second polymer layer capable of showing a light-scattering state, is supplied with thermally controlled image data to control the chiral pitch of the first polymer layer so as to provide a desired wavelength for selective scattering reflection or transmittance while providing the second polymer layer with a light-transmissive state.

In this instance, either one of the first and second polymer layers having a higher mesomorphic range is first subjected to selection of a display state.

Figure 10:
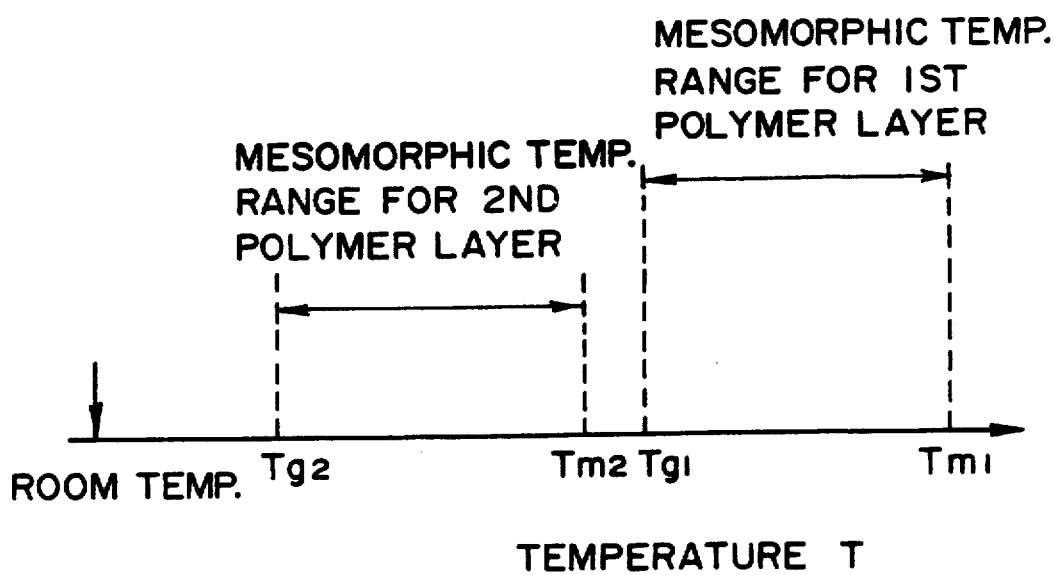
FIGS. 10 and 12 respectively show a relationship between mesomorphic temperature ranges of first and second polymer layers.
Figure 11:
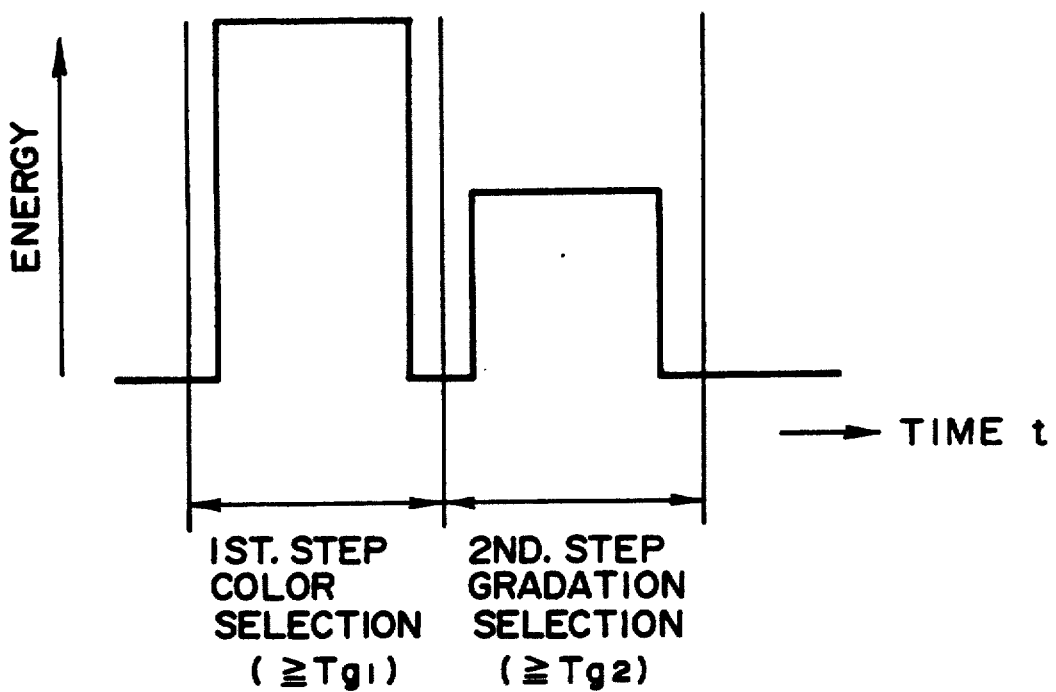
FIGS. 11 and 13 respectively show an energy pulse pattern applied to a thermal head in first and second steps in a display method of the present invention.

More specifically, in case where the first polymer layer has a higher mesomorphic temperature range than the second polymer layer, a thermal signal for controlling the chiral pitch of the first polymer layer to provide a desired color may be applied in a first step, and a thermal signal for determining the transmissive state of the second polymer layer may be applied in a second step. In this case, the thermal signal for determining the transmissive state of the second polymer layer applied in the second step may preferably be one comprising gradation data (FIGS. 10 and 11).

Figure 12:
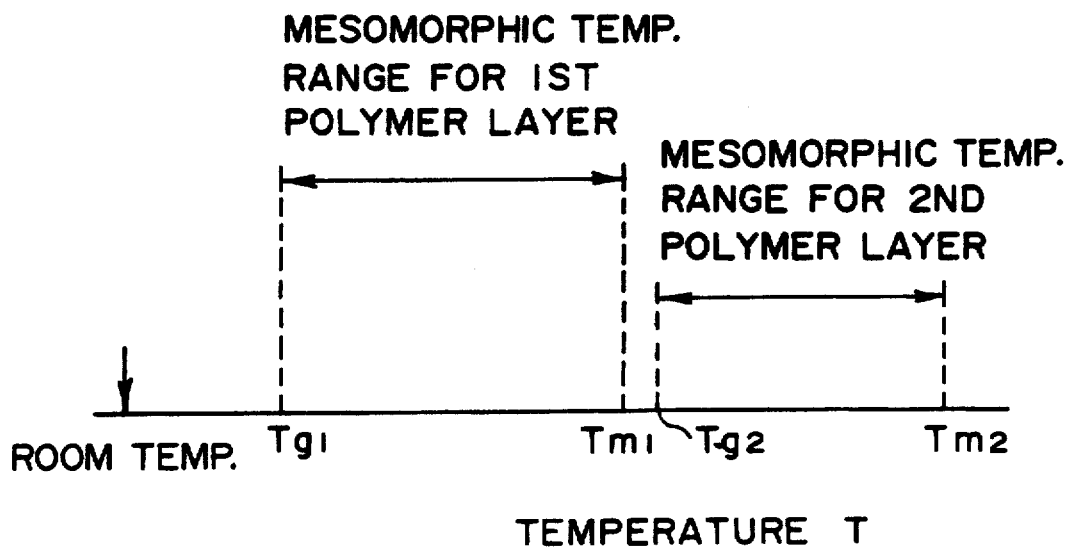
Figure 13:
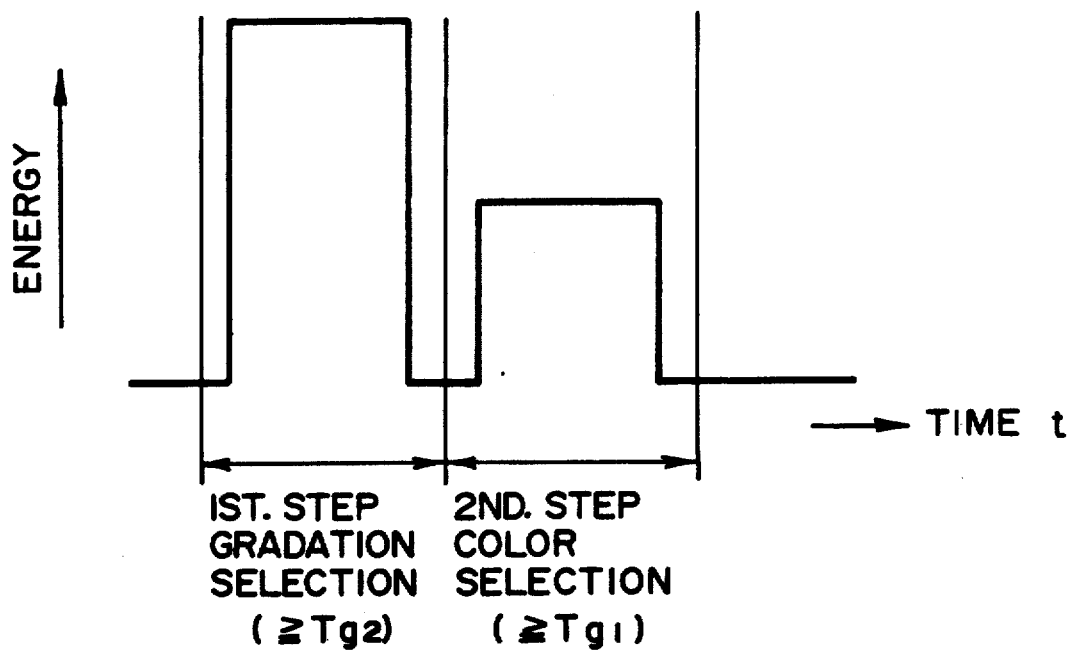

On the other hand, in case where the first polymer layer has a lower mesomorphic temperature range than the second polymer layer, a thermal signal for determining the transmissive state of the second polymer layer may be applied in a first step, and a thermal signal for controlling the chiral pitch of the first polymer layer to provide a desired color may be applied in a second step. In this case, the thermal signal for determining the transmissive state of the second polymer layer applied in the first step may preferably be one comprising gradation data (FIGS. 12 and 13).

The above-mentioned display or color presentation function of the display medium according to the present invention may be attained in a case wherein the second polymer layer is disposed on the first polymer layer and a thermal means is actuated from the side of the second polymer layer, and a case wherein the first polymer layer is disposed on the second polymer layer and a thermal means is actuated from the side of the first polymer layer. In any case, when the thermal means is a thermal head, a thin protective layer of silicone resin, fluorine-containing resin, polyimide, etc., may be disposed on an upper one of the first and second polymer layers.

Further, in case where the first polymer layer is disposed as a lower layer on a substrate 1, it is effective to dispose a homogeneous alignment film of polyimide, polyvinyl alcohol, etc., subjected to a uniaxial aligning treatment such as rubbing or a homeotropic alignment layer, in order to improve the color purity of the displayed color of the first polymer layer. It is possible to further improve the aligning characteristic of the first polymer layer by disposing such an alignment layer as described above between the first and second polymer layers, e.g., by shearing application or another method.

Figure 14A:
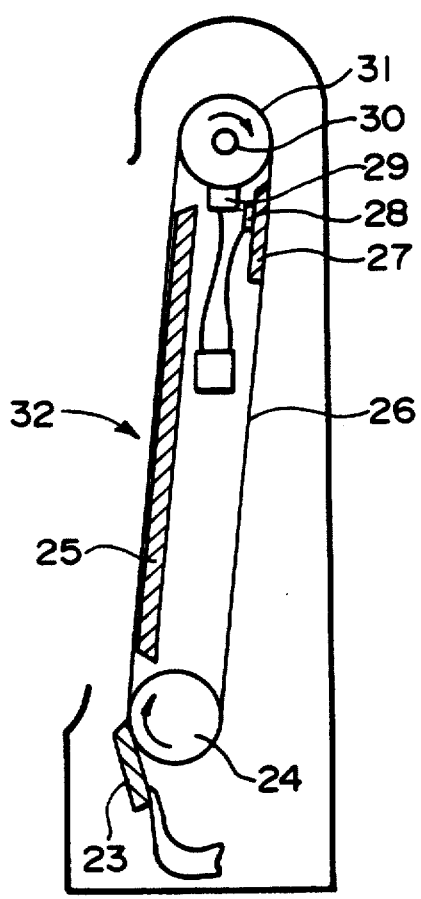
Figure 14B:
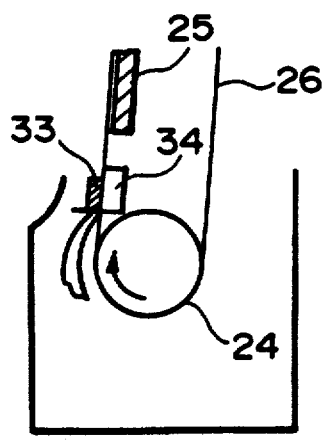

A display medium of the present invention as shown in FIG. 1A, 1B, 2 or 8 described above may be incorporated in a display apparatus as shown in FIG. 14A, 14B or 15 to provide a display of a direct view-type or projection-type.

More specifically, a display apparatus shown in FIG. 14A comprises a display medium 26 as described above, a thermal head 23 of a multi-head type, a drive roller 24, a backing plate 25 of a chromatic color or black, a planar heater 27, a temperature sensor 28, a temperature sensor 29, a halogen lamp 30, a roller (halogen heater) 31, and a display zone 32. The lower part of the apparatus shown in FIG. 14A can be modified to comprise a thermal head 33 of a serial head-type and a platen 34 as shown in FIG. 14B.

Further, a display apparatus shown in FIG. 15 comprises a display medium 26 as described above in the form of an endless belt wrapped around drive rollers 24A–24C, a thermal head 23, a projection optical system 34 and a screen 35.

According to the display apparatus shown in FIG. 14A or 14B, a color image displayed on a white background may be directly observed. According to the display apparatus shown in FIG. 15, when an image on the display medium is projected on a white screen 35, a luminescent color image is displayed on the background of a dark color. This is attained as an effect of the second polymer layer disposed as a light-scattering layer.

Hereinbelow, the present invention will be explained more specifically based on Examples.

EXAMPLE 1

Figure 4:
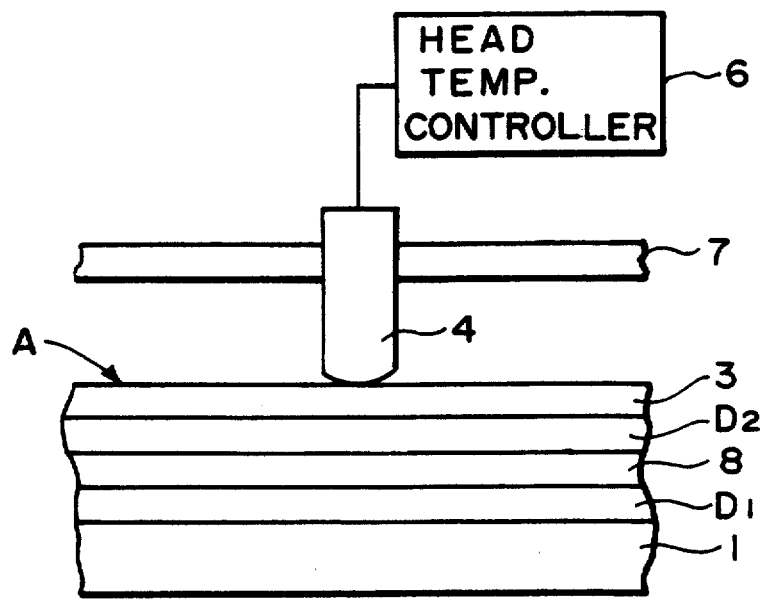
FIGS. 4 and 5 are schematic views illustrating display methods using a display medium of Example 1 and Example 2, respectively.

A display medium A having a structure as shown in FIG. 4 was prepared. First of all, a glass substrate 1 having thereon a uniaxially rubbed polyimide alignment film (not specifically shown) was coated with a dichloroethane solution of a polymer liquid crystal represented by the following formula (I) ($n=20–100$), followed by drying to form an about 10 micron-thick display layer (I layer) $D_1$. Then, an aqueous solution of polyvinyl alcohol was applied thereon and dried to form an about 0.5 micron-thick intermediate layer 8, and thereon a dichloroethane solution of a polymer liquid crystal represented by the following formula (II) (Mw (molecular weight)=15000 (calculated as polystyrene) based on GPC (gel permeation chromatography) data was applied and dried to form an about 10 micron-thick display layer (II layer) $D_2$.

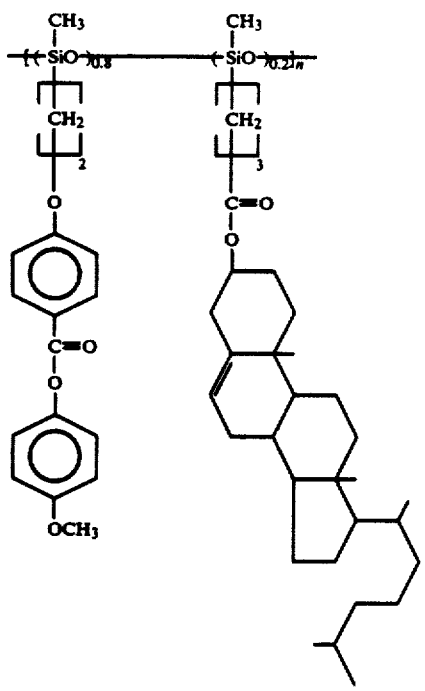

$Tg = 25° C., Tc = 120° C.$

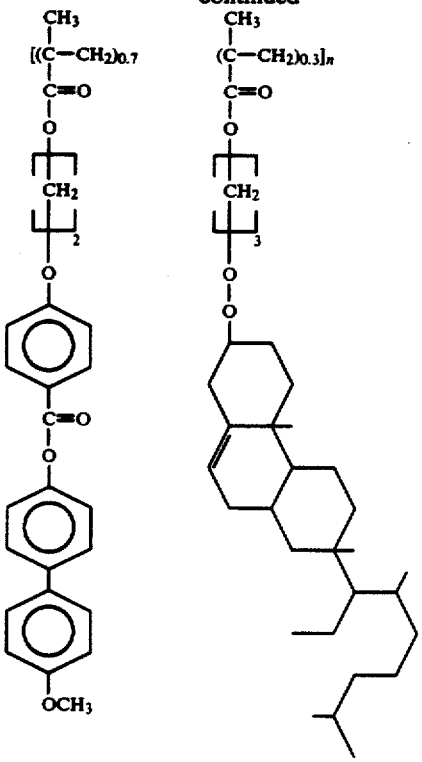

$Tg = 120° C., Tc = 280° C.$

Then, a 10 micron-thick polyimide film was laminated on the display layer (II layer) $D_2$ by heatpressure bonding at 200° C. to form a display medium A as shown in FIG. 4, which was then subjected to a display method as illustrated in FIG. 4.

For selecting the I layer, a thermal head 4 movably mounted on a head driver 7 and controlled by a thermal head temperature controller 6 was actuated to heat a display pixel to 290° C. and turned off to cool the pixel to 100° C. Then, the thermal head 4 was controlled to gradually cool the pixel to room temperature in 30 seconds, whereby a red color was displayed at the pixel.

Then, for selecting the II layer, the thermal head 4 was actuated to heat and hold a pixel at 270° C. and then turned off to rapidly cool the pixel to room temperature, whereby a green color was displayed.

Further, the thermal head 4 was actuated to heat a pixel to 290° C. and then the energy thereto was gradually decreased to zero in 5 minutes, whereby a yellow color was displayed. When the energy was decreased to zero in 1 minute, a reddish yellow color was displayed.

EXAMPLE 2

A glass substrate provided with a rubbed polyimide alignment film was coated with a dichloroethane solution of a polymer liquid crystal represented by the formula (III) ($n=20–50$) shown below mixed with an infrared absorber (IR-750, mfd. by Nihon Kayaku) in a proportion of 1 wt. % of the polymer liquid crystal, followed by drying to form an about 10 micron-thick display layer (III layer). The III layer was then laminated with an about 10 micron-thick polyimide film and further coated with a dichloroethane solution of a polymer liquid crystal represented by the formula (IV) shown below (Mw=20000 (calculated as polystyrene) based on GPC) mixed with 1 wt. % thereof of an infrared absorber (IR-759), followed by drying to form an about 20 micron-thick display layer (IV layer).

The laminate thus formed was held at 90° C. for 5 hours and observed through a polarizing microscope, whereby SmC* (chiral smectic C phase) was observed in the display layer (IV layer). The display layer was further laminated with an about 10 micron-thick polyimide film and then coated with a dichloroethane solution of a polymer liquid crystal of the formula (V) below (Mw=12000 (as polystyrene) based on GPC) mixed with 1 wt. % thereof of an infrared absorber (IR-750), followed by drying to form an about 10 micron-thick display layer (V layer), whereby a display medium A of a three-display layer structure was obtained.

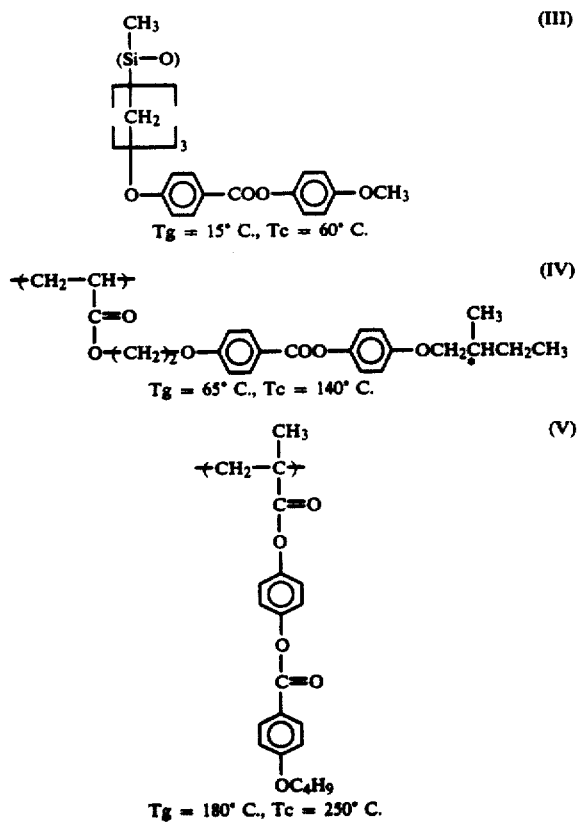

Figure 5:
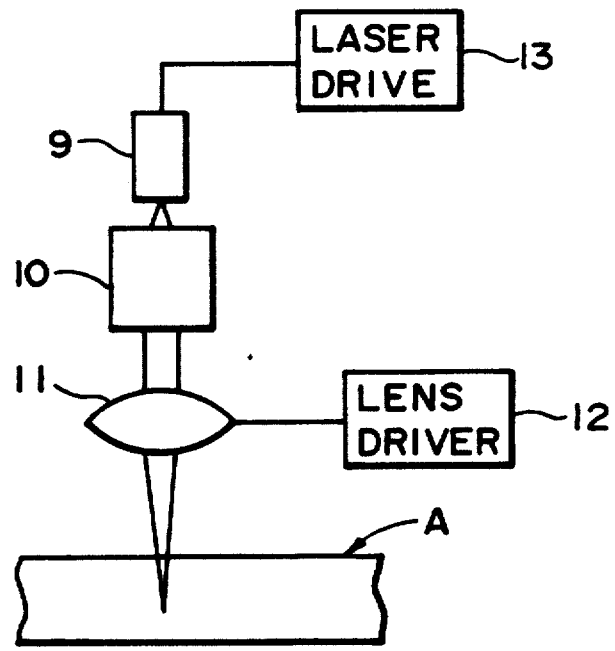

Then, the display medium A thus obtained was incorporated in a system as shown in FIG. 5 and illuminated with laser light having a wavelength of 780 nm generated from and a semiconductor laser 9 driven by a laser driver 13 and passed through a collimator lens 10 and a condenser (objective) lens 11 driven by a driver 12. The laser light was incident at a power of 10 mW for a spot diameter of 5 microns, once turned off and then again caused to be incident at a power of 1 mW, whereby a record of a blue-white color was displayed only at the III layer.

Then, the laser light was incident at 10 mW, gradually decreased to 8 mW and then turned off, whereby a white-colored record was displayed only at the V layer. Then, the laser light was first incident at 10 mW, once turned off, again incident at 5 mW and then again turned off, whereby a yellow-white record was formed only at the IV layer.

Further, the laser light was first incident at 10 mW and gradually turned off in 5 minutes, whereby a white color was displayed. On the other hand, when the laser light was turned off in 30 sec, a blue black color was displayed.

EXAMPLE 3

A display medium as shown in FIG. 8 was prepared by coating a substrate 1 with a 20 micron-thick first polymer layer 21 of a thermotropic polymer liquid crystal represented by the formula (VI) below showing cholesteric phase in the temperature range of about 120°-150° C. in which the wavelength of scattering or transmittance continuously varied depending on the temperature over the entire visible region, and further with a 10 micron-thick second polymer layer 22 of a polymer liquid crystal of the above-mentioned formula (50) (showing a glass transition temperature $(Tg_2)=75°$ C. and a mesomorphic range upper limit (more specifically, nematic-isotropic transition temperature, $Tm_2)=110°$ C.

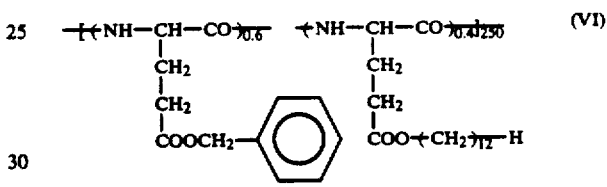

Thus, a relationship as shown in FIG. 10 was satisfied. The second polymer layer of the formula (50) showing a light-scattering state in the mesomorphic phase assumed a transparent isotropic state above 120° C.

The display medium having a structure as shown in FIG. 8 prepared above was heated to 140° C., held thereat for 30° C. and rapidly cooled to room temperature at a rate of more than 100° C./min, whereby a green display was obtained. When the same display medium was gradually cooled at a rate of less than 5° C./min., a greenish-white color was displayed. On the other hand, a red display was obtained when the medium was held at 150° C. followed by rapid cooling, and a blue display was obtained when the medium was held at 130° C. followed by rapid cooling.

Accordingly, a temperature distribution image in a range exceeding 120° C. imparted to the display medium could be converted into a color image.

Several methods of imparting such a temperature distribution as described above are shown below:

1) A pulse duty applied to a thermal head is modulated depending desired colors.
2) A voltage applied to a thermal head is modulated depending on desired colors.
3) A thermal head is supplied with an energy providing a temperature in excess of the isotropic transition temperature of the first polymer layer 21 and the thermal head is gradually cooled at a rate depending on desired colors in a temperature range exceeding the isotropic transition temperature of the second polymer layer 22.

Among the above, the method (3) is particularly effective.

EXAMPLE 4

Another method using a display medium identical to one used in the above Example 3 is described.

After a first step of a mesomorphic temperature above $Tg_1$ for selecting the color of the first polymer layer, a second step is provided for selecting a temperature above $Tg_2$ of the second polymer layer or the time for keeping the temperature to substantially fix the color of the first polymer layer and control the transmissivity of the second polymer layer depending on given gradation data. As a result, a color is provided with a desired density and is fixed as it is by a subsequent rapid cooling to room temperature, whereby a full color display can be realized in principle.

FIG. 11 is a diagram schematically illustrating the above procedure in the form an energy pulse level applied to a thermal head.

Referring to FIGS. 10 and 11, the mesomorphic temperature ranges of the first and second polymer layers can overlap each other to some extent, but a relationship of $Tm_2$ (isotropic transition temperature of the second polymer layer) $\leq Tg_1$ (glass transition temperature of the first polymer layer) may preferably be satisfied in order to provide a better control in image formation.

The images formed in Examples 3 and 4 can be erased by heating the display medium once at least above the isotropic transition temperature of the second polymer layer, followed by gradual cooling to provide a superficially uniform white scattering state.

EXAMPLE 5

A display medium as shown in FIG. 8 was prepared by coating a substrate 1 with a 20 micron-thick first polymer layer 21 of a thermotropic polymer liquid crystal represented by the formula (VII) below and further with a 10 micron-thick second polymer layer 22 of a polymer liquid crystal of the above-mentioned formula (53) (showing a glass transition temperature $(Tg_2) = 140°$ C. and a mesomorphic range upper limit (more specifically, smectic-isotropic transition temperature, $Tm_2) = 196°$ C.

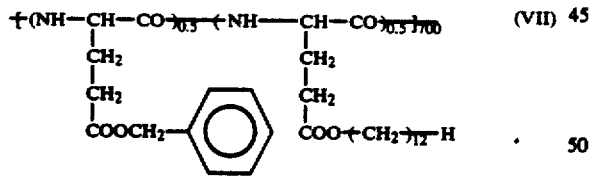

(VII)

The thermotropic polymer liquid crystal of the above formula (VII) is a liquid crystal showing a cholesteric phase in the range of 110° C. to a little higher than 200° C. in which the liquid crystal shows a dynamic range of about 110°–135° C. for selective scattering or transmittance in visible region.

Thus, a relationship as shown in FIG. 12 is satisfied. The second polymer layer of the formula (53) showing a light-scattering in the mesomorphic state assumes a transparent isotropic state above 200° C. Accordingly, when the display medium in a laminated structure shown in FIG. 8 is heated to an appropriate temperature and then rapidly cooled to a temperature below the glass transition point of the second polymer layer, the second polymer layer 22 is fixed in a transparent state. Alternatively, when the heating temperature above the glass transition temperature or the cooling speed down to below the glass transition temperature of the second polymer layer is appropriately selected, an intermediately transmissive state, i.e., so-called gradational display, can be realized.

On the other hand, the first polymer layer shows a dynamic range for presenting color in visible region in the neighborhood of or just below the glass transition point (140° C.) of the second polymer layer. Accordingly, after determining the transmissivity or clarity of the second polymer layer and during the course of cooling down to room temperature, a temperature control may be effected to determine the color of the first polymer layer.

In this manner, a color image is formed and fixed on the display medium according to the present invention through a thermal control including a first step for providing a temperature distribution determining the transmissivity of the second polymer layer and a second step for providing a temperature distribution determining the color presentation of the first polymer layer.

The above-mentioned temperature distribution may be provided by modulating the pulse duty or voltage level of a voltage pulse applied to a thermal head depending on desired colors. The image formed is provided with a color density so that a full color display can be realized in principle.

FIG. 13 is a diagram schematically illustrating the above procedure in the form an energy pulse level applied to a thermal head. Referring to FIGS. 12 and 13, the mesomorphic temperature ranges of the first and second polymer layers can overlap each other to some extent, but a relationship of $Tm_1$ (isotropic transition temperature of the first polymer layer) $\leq Tg_2$ (glass transition temperature of the second polymer layer) may preferably be satisfied in order to provide a better control in image formation.

The images formed the above-described manner can be erased by heating the display medium above the isotropic transition temperature of the second polymer layer, followed by gradual cooling to provide superficially uniform white scattering state.

As described hereinabove, according to the display medium, display method and display apparatus of the present invention, a plurality of display layers of the display medium can be independently controlled with respect to one or more layers. As a result, each pixel can be controlled with respect to a color and its density, so that a full-color highly fine image display can be realized.

What is claimed is:

1. A liquid crystal display medium having a display face and comprising a plurality of display layers laminated parallel to the display face, each display layer comprising a polymer liquid crystal having a mesomorphic temperature range between its glass transition temperature and the upper limit temperature of a liquid crystal phase for display, wherein the mesomorphic temperature ranges of said plurality of display layers do not overlap each other.

2. A liquid crystal display medium according to claim 1, wherein one of the plurality of display layers has a glass transition temperature which is higher than the mesomorphic-isotropic transition temperature of another display layer.

3. A liquid crystal display medium according to claim 1, wherein said plurality of display layers comprise polymer liquid crystals having helical structures with different helical patches.

4. A liquid crystal display medium according to claim 3, wherein the polymer liquid crystals having helical structures include one having a chiral nematic phase.

5. A liquid crystal display medium according to claim 3, wherein the polymer liquid crystals, having helical structures include one having a chiral smectic phase.

6. A liquid crystal display medium having a display face and comprising a plurality of display layers laminated parallel to the display face and including a first display layer comprising a chiral structure, and a second display layer having a light scattering state, each display layer comprising a polymer liquid crystal showing a mesomorphic temperature range between its glass transition temperature and the upper limit temperature of a liquid crystal phase for display, wherein the mesomorphic temperature ranges of the first and second display layers do not overlap each other.

7. A liquid crystal display medium according to claim 6, wherein one of the first and second display layers has a glass transition temperature which is higher than the mesomorphic-isotropic transition temperature of the other of the first and second display layers.

8. A liquid crystal display method, comprising:
providing a display medium having a display face and comprising a plurality of display layers laminated parallel to the display face, each display layer comprising a polymer liquid crystal having a mesomorphic temperature range between its glass transition temperature and the upper limit temperature of a liquid crystal phase for display, wherein the mesomorphic temperature ranges of said plurality of display layers do not overlap each other; and
controlling the optical densities of the display layers independently from the other display layer(s) by controlling the heating temperatures and cooling rates of the display layers.

9. A liquid crystal display method according to claim 8, wherein the optical densities are controlled through temperature modulation by means of a thermal head.

10. A liquid crystal display method according to claim 8, wherein the optical densities are controlled through temperature modulation by means of a laser.

11. A liquid crystal display method, comprising:
providing a display medium having a display face comprising a plurality of display layers laminated parallel to the display face and including a first display layer comprising a chiral structure, and a second display layer having a light-scattering state, each display layer comprising a polymer liquid crystal having a mesomorphic temperature range between its glass transition temperature and the upper limit temperature of a liquid crystal phase for display, wherein the mesomorphic temperature ranges of the first and second display layers do not overlap each other; and
controlling the optical densities of the display layers independently from the other display layer(s) by controlling the heating temperatures and cooling rates of the display layers.

12. A liquid crystal display method according to claim 11, wherein the optical densities are controlled through temperature modulation by means of a thermal head.

13. A liquid crystal display method according to claim 11, wherein the optical densities are controlled through temperature modulation by means of a laser.

14. A liquid crystal display apparatus, comprising:
a display medium having a display face and comprising a plurality of display layers laminated parallel to the display face, each display layer comprising a polymer liquid crystal having a mesomorphic temperature range between its glass transition temperature and the upper limit temperature of a liquid crystal phase for display, wherein the mesomorphic temperature ranges of said plurality of display layers do not overlap each other; and
control means for controlling the optical densities of the respective display layers independently from the other display layer(s) by controlling the cooling rates and heating temperatures of the display layers.

15. A liquid crystal display apparatus according to claim 14, wherein said control means comprises a thermal head.

16. A liquid crystal display apparatus according to claim 14, wherein said control means comprises a laser.

17. A liquid crystal display apparatus, comprising:
a display medium having a display face comprising a plurality of display layers laminated parallel to the display face and including a first display layer comprising a chiral structure, and a second display layer having a light-scattering state, each display layer comprising a polymer liquid crystal having a mesomorphic temperature range between its glass transition temperature and the upper limit temperature of a liquid crystal phase for display, wherein the mesomorphic temperature ranges of the first and second display layers do not overlap each other; and
control means for controlling the optical densities of the respective display layers independently from the other display layer(s) by controlling the heating temperatures and cooling rates of the display layers.

18. A liquid crystal display apparatus according to claim 17, wherein said control means comprises a thermal head.

19. A liquid crystal display apparatus according to claim 17, wherein said control means comprises a laser.

* * * * *

UNITED STATES PATENT AND TRADEMARK OFFICE
CERTIFICATE OF CORRECTION

PATENT NO. : 5,066,107
DATED : November 19, 1991
INVENTOR(S) : KAZUO YOSHINAGA ET AL.

It is certified that error appears in the above-identified patent and that said Letters Patent is hereby corrected as shown below:

ON THE TITLE PAGE,
AT [54] TITLE

"LIQUID CRYSTAL DISPLAY MEDIUM, LIQUID CRYSTAL DISPLAY METHOD AND LIQUID CRYSTAL DISPLAY APPARATUS FOR OUTPUTTING COLOR IMAGES" should read --THERMALLY ADDRESSED POLYMER LIQUID CRYSTAL MEDIUM, APPARATUS AND METHOD FOR OUTPUTTING COLOR IMAGES--.

ON THE TITLE PAGE,
AT [75] INVENTORS

"Shuzo Keneko," should read --Shuzo Kaneko,--.

ON THE TITLE PAGE,
AT [56] REFERENCES CITED

Foreign Patent Documents,
"62-014114  11/1987  Japan." should read
--62-014114  1/1987  Japan.--.

COLUMN 1

Lines 2-5, "LIQUID CRYSTAL DISPLAY MEDIUM, LIQUID CRYSTAL DISPLAY METHOD AND LIQUID CRYSTAL DISPLAY APPARATUS FOR OUTPUTTING COLOR IMAGES" should read
--THERMALLY ADDRESSED POLYMER LIQUID CRYSTAL MEDIUM, APPARATUS AND METHOD FOR OUTPUTTING COLOR IMAGES--.
Line 22, "nematic)type" should read --nematic)-type--.
Line 45, "filling" should read --filing--.
Line 59, "reports" should read --report--.

UNITED STATES PATENT AND TRADEMARK OFFICE
CERTIFICATE OF CORRECTION

PATENT NO. : 5,066,107
DATED : November 19, 1991
INVENTOR(S) : KAZUO YOSHINAGA ET AL.

It is certified that error appears in the above-identified patent and that said Letters Patent is hereby corrected as shown below:

COLUMN 3

Line 35, "case," should read --cases,--.

COLUMN 4

Form (2),

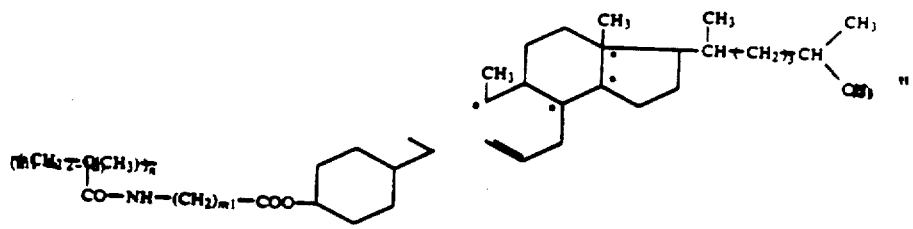

should read

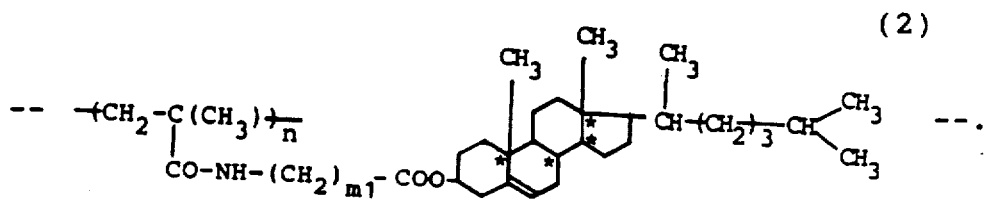

($m1 = 2 - 10$)

UNITED STATES PATENT AND TRADEMARK OFFICE
CERTIFICATE OF CORRECTION

PATENT NO. : 5,066,107
DATED : November 19, 1991
INVENTOR(S) : KAZUO YOSHINAGA ET AL.

It is certified that error appears in the above-identified patent and that said Letters Patent is hereby corrected as shown below:

COLUMN 7

Form (11), "" should read ----.

Form (12), "" should read ----.

COLUMN 14

Line 12, "groups" should read --group--.
Line 15, "(26)" (second occurrence) should be deleted.

UNITED STATES PATENT AND TRADEMARK OFFICE
CERTIFICATE OF CORRECTION

PATENT NO. : 5,066,107
DATED : November 19, 1991
INVENTOR(S) : KAZUO YOSHINAGA ET AL.

It is certified that error appears in the above-identified patent and that said Letters Patent is hereby corrected as shown below:

COLUMN 20

Line 8, "(29)" should read --(39)--.

COLUMN 21

Form (48), "SmI" should read --SmH--.
Line 51, "dis-" should read --di--.
Line 52, "cotic" should read --chrotic--.
Line 56, "dichorism." should read --dichroism.--.
Line 64, "1 -200" should read --1-200--.

COLUMN 23

Line 4, "fluorides cerium" should read
   --fluoride, cerium--.

COLUMN 24

Line 3, "of" should be deleted.
Line 9, "stampling" should read --stamping--.

COLUMN 26

Line 9, "temperature" should read --a temperature--.

COLUMN 27

Line 62, "discotic" should read --dichrotic--.

COLUMN 28

Form (50), "$\underline{100°C.}$ Iso." should read --$\underline{110°C.}$ Iso.--.

UNITED STATES PATENT AND TRADEMARK OFFICE
CERTIFICATE OF CORRECTION

PATENT NO. : 5,066,107
DATED : November 19, 1991
INVENTOR(S) : KAZUO YOSHINAGA ET AL.

It is certified that error appears in the above-identified patent and that said Letters Patent is hereby corrected as shown below:

COLUMN 29

Line 7, "principle" should read --principal--.
Line 18, "1a" should read --(1a)--.
Line 32, "curve 1a" should read --curve (1a)--.
Line 36, "curve 1b" should read --curve (1b)--.
Line 59, "abovedescribed" should read --above-described--.

COLUMN 32

Line 3, "$[(C-CH_2)_{0.7} \quad (C-CH_2)_{0.3}]_n$" should read --$[(C-CH_2)_{0.7}\text{———}(C-CH_2)_{0.3}]_n$--.
Line 34, "heatpressure" should read --heat-pressure--.
Line 37, "FIG. 4" should read --FIG. 3--.

COLUMN 33

Line 54, "and" should be deleted.

COLUMN 34

Line 56, "depending" should read --depending on--.

COLUMN 35

Line 17, "form" should read --form of--.

COLUMN 36

Line 29, "form" should read --form of--.
Line 38, "formed" should read --formed in--.

UNITED STATES PATENT AND TRADEMARK OFFICE
CERTIFICATE OF CORRECTION

PATENT NO. : 5,066,107
DATED : November 19, 1991
INVENTOR(S) : KAZUO YOSHINAGA ET AL.

It is certified that error appears in the above-identified patent and that said Letters Patent is hereby corrected as shown below:

COLUMN 37

Line 2, "patches." should read --pitches.--.
    Line 7, "crystals," should read --crystals--.
    Line 14, "showing" should read --having--.

Signed and Sealed this

Eighth Day of September, 1992

Attest:

DOUGLAS B. COMER

Attesting Officer      Acting Commissioner of Patents and Trademarks